US006901188B2

(12) United States Patent
Brennan, III

(10) Patent No.: US 6,901,188 B2
(45) Date of Patent: May 31, 2005

(54) DISPERSION COMPENSATION MODULES WITH FIBER BRAGG GRATINGS

(75) Inventor: James F. Brennan, III, Austin, TX (US)

(73) Assignee: 3M Innovative Properties Company, St. Paul, MN (US)

(*) Notice: Subject to any disclaimer, the term of this patent is extended or adjusted under 35 U.S.C. 154(b) by 165 days.

(21) Appl. No.: 10/393,219

(22) Filed: Mar. 20, 2003

(65) Prior Publication Data

US 2003/0180000 A1 Sep. 25, 2003

Related U.S. Application Data

(63) Continuation-in-part of application No. 09/809,393, filed on Mar. 15, 2001, now Pat. No. 6,577,792.

(51) Int. Cl.[7] ................................................ G02B 6/34
(52) U.S. Cl. ......................... 385/37; 385/122; 398/84; 398/87
(58) Field of Search ............................. 385/10, 24, 37, 385/122, 123; 398/84, 87

(56) References Cited

U.S. PATENT DOCUMENTS

| 5,718,738 A | 2/1998 | Kohnke et al. |
| 6,292,601 B1 | 9/2001 | Laming et al. |
| 6,400,868 B1 | 6/2002 | Riant et al. |

FOREIGN PATENT DOCUMENTS

| EP | 0 886 153 A2 | 12/1998 |
| EP | 1 030 472 A2 | 8/2000 |
| WO | WO 96/23372 | 8/1996 |
| WO | WO 00/02077 | 1/2000 |
| WO | WO 00/50944 | 8/2000 |

OTHER PUBLICATIONS

Tamil, L.S., et al; "Dispersion Compensation for High Bit Rate Fiber–Optic Communication Using a Dynamically Tunable Optical Filter", *Applied Optics* (20 Mar. 199); Optical Society of America; vol. 33, No. 9; pp. 1697–1706.

(Continued)

*Primary Examiner*—Tarifur R. Chowdhury
*Assistant Examiner*—Michael H Caley
(74) *Attorney, Agent, or Firm*—Gregg B. Rosenblatt

(57) ABSTRACT

A device used for dispersion compensation of a plurality of optical signals passing through an optical transmission line. The device includes a photosensitive optical fiber including a long length, chirped Bragg grating providing dispersion compensation over a wide bandwidth of optical signals. The long length chirped Bragg grating has a reflection bandwidth greater than about 25 nm, and further has reduced distortion at a bit rate of about $10^{-9}$. This reduced distortion leads to a power penalty of less than 3 dB during less than 25 nm stepwise changes in wavelength of the plurality of optical signals across the wide bandwidth. The device provides a dispersion greater than about 100 ps/nm in a optical transmission line operating at 10 Gbit/s.

10 Claims, 21 Drawing Sheets

OTHER PUBLICATIONS

Ennser, K., et al; "Analysis of 40 Gb/s TDM–Transmission over Embedded Standard Fiber Employing Chirped Fiber Grating Dispersion Compensators", *IEEE Journal of Lightwave Technology* (May 1998); vol. 16, No. 5; pp. 807–811.

Brennan III, J.F., et al; "Dispersion and Dispersion–Slope Correction with a Fiber Bragg Grating over the Full C–Band", *Optical Fiber Communication Conference, Technical Digest Postconference Edition, Anaheim, CA* (Mar. 17, 2001); vol. 54; pp. PD12–1—PD12–3.

W.H. Loh, et al; "Dispersion Compensation Over Distances in Excess of 500 km for 10–Gb/s Systems Using Chirped Fiber Gratings", *IEEE Photonics Technology Letters* (Jul. 1996); vol. 8, No. 7; pp. 944–946.

W.H. Loh, et al; "10 Gb/s Transmission Over 700 km of Standard Single–Mode Fiber with 10–cm Chirped Fiber Grating Compensator and Duobinary Transmitter", *IEEE Photonics Technology Letters* (Sep. 1996); vol. 8, No. 9; pp. 1258–1260.

M. Ibsen, et al; "Long Continuously Chirped Fibre Bragg Gratings for Compensation of Linear– and 3rd Order–Dispersion", *European Conference on Optical Communication* (1997).

A. Asseh, et al; "A Writing Technique for Long Fiber Bragg Gratings with Complex Reflectivity Profiles", *Journal of Lightwave Technology* (Aug. 1997); vol. 15, No. 8; pp. 1419–1423.

T. Komukai, et al, "Fabrication of Non–Linearly Chirped Fiber Bragg Gratings for Higher–Order Dispersion Compensation", *Optics Communications* (Aug. 15, 1998); Elsevier Science B.V.; North–Holland Publishing Co., Amsterdam, NL, vol. 154, No. 1–3, , pp. 5–8.

H. Rourke, et al; "Fabrication of Extremely Long Fibre Gratings by Phase Matched Concatenation of Multiple Short Sections", *Bragg Gratings, Photosensitivity, and Poling in Glass Waveguides*, Optical Society of America, Technical Digest (Sep. 23–25, 1999); pp. 32/ThD1–1—34/ThD1–3.

R. Kashyap, et al; "Infinite Length Gratings", *Bragg Gratings, Photosensitivity, and Poling in Glass Waveguides*, Optical Society of America, Technical Digest (Sep. 23–25, 1999); pp. 38/ThD3–1—40/ThD3–3.

M. Rocha, et al; "System Impact of the Physical Length of Unapodised Chirped Fiber Bragg Gratings on Dispersion Compensation", *SBMO/IEEE MTT–S IMOC '99 Proceedings* (1999); IEEE; pp. 565–569.

A.H. Gnauck, et al; "4×40 Gb/s 75–km WDM Transmission Over Conventional Fiber Using a Broad–Band Fiber Grating", *IEEE Photonics Technology Letters* (Nov. 1999); vol. 11, No. 11; pp. 1503–1505.

R. Feced, et al; "Effects of Random Phase and Amplitude Errors in Optical Fiber Bragg Gratings", *Journal of Lightwave Technology* (Jan. 2000); vol. 18, No. 1; pp. 90–101.

L.D. Garrett, et al; "Cascaded Chirped Fiber Gratings for 18–nm–Bandwidth Dispersion Compensation", *IEEE Photonics Technology Letters* (Mar. 2000); vol. 12, No. 3; pp. 356–358.

A.H. Gnauck, et al; "16×20–Gb/s, 400–km WDM Transmission Over NZDSF Using a Slope–Compensating Fiber–Grating Module", *IEEE Photonics Technology Letters* (Apr. 2000); vol. 12, No. 4; pp. 437–439.

M. Ibsen, et al; "Custom Design of Long Chirped Bragg Gratings: Application to Gain–Flattening Filter with Incorporated Dispersion Compensation", *IEEE Photonics Technology Letters* (May 2000); vol. 12, No. 5; pp. 498–500.

T. Niemi, et al; "Measurements of Dense Group Delay Ripple Using the Phase Shift Method: Effect of Modulation Frequency", *Conference: Proceedings of Symposium on Optical Fiber Measurements, Sponsor: NIST, IEEE Lasers & Eletro–Opt. Soc*, Opt.Soc.America (Sep. 26–28, 2000); Boulder, CO; pp. 165–167.

T. Niemi, et al; "Limitations of Phase–Shift Method in Measuring Dense Group Delay Ripple of Fiber Bragg Gratings", *IEEE Photonics Technology Letters* (Dec. 2001); vol. 13, No. 12; pp. 1334–1336.

DISPERSION COMPENSATION MODULES WITH FIBER BRAGG GRATINGS

CROSS REFERENCE TO RELATED APPLICATION

This application is a continuation-in-part of U.S. application Ser. No. 09/809,393, filed on Mar. 15, 2001, now U.S. Pat. No. 6,577,792.

FIELD OF THE INVENTION

The present invention relates to chromatic dispersion of light waves in fiber optic systems and more particularly to a wide-bandwidth dispersion compensation device incorporating a chirped fiber Bragg grating, fabricated for low optical phase distortion upon reflection, to provide high fidelity light signals over the full range of telecommunications transmission bands.

BACKGROUND OF THE INVENTION

Modern communication system providers are striving to increase the capacity of their systems to satisfy the rapidly growing exchange of information around the world. Increasing the data rate of a single wavelength channel is one strategy to increase the throughput on optical fibers. However, this approach is limited in that the data rate for a single optical channel will eventually reach practical limitations. An important strategy to further increase the available bandwidth is to add multiple wavelength channels. Multiple wavelength systems are referred to as being wavelength division multiplexed (WDM).

Optical communications systems are available with single-channel data rates at 10 Gbit/s and faster. To accommodate the spectral bandwidth of these signals, the channels in a WDM system are commonly spaced at 100 GHz, or ~0.8 nm in the 1550 nm wavelength range. A device would have to be useful over bandwidths greater than ~0.8 nm to be a truly multi-channel device in these WDM systems. Ideally a device would operate over a full communications band of wavelengths, so systems could be designed for any WDM or modulation scheme without needing to accommodate a specific dispersion correction module. Current communications bands are defined by optical amplifier operating ranges; for instance, the "C" band covers ~1530 nm to ~1560 nm and the "L" band covers ~1570 nm to ~1610 nm.

In these optical communications systems, short pulses of optical energy are sent through optical fibers to transmit information. These optical data pulses are comprised of a spectrum of wavelengths. Generally speaking, an unchirped pulse of duration t has a spectral width of ~1/t, e.g., a ~1 nanosecond ($10^{-9}$ second) pulse has a ~1 GHz ($10^9$ Hz) spectral width. As a pulse travels along standard singlemode fiber in the ~1550 nm range, the shorter wavelength components travel faster than the longer-wavelength components. This effect, called chromatic dispersion, broadens the pulse to the point that it eventually interferes with neighboring pulses in a pulse train and introduces errors in the detected data stream. A number of solutions have been proposed for this problem, but only dispersion-compensating fiber (DCF) and chirped fiber Bragg gratings have been considered seriously as potential candidates for deployment.

Dispersion-compensating fiber has high levels of dispersion of opposite sign to that of standard fiber. To compensate for the dispersion introduced by an 80-km span of standard fiber, one would have to concatenate a ~16-km length of DCF into the system. These compensation modules are bulky, and due to the fiber design, suffer high optical attenuation and increased optical nonlinear effects. However, DCF is used today since no serious alternative exists.

Fiber Bragg Gratings (FBGs) provide a promising solution for dispersion compensation. A fiber Bragg grating comprises an optical fiber or other optical waveguide having periodic, aperiodic or pseudo-periodic variations of the refractive index along its length in the light guiding region of the waveguide. Gratings are usually written in photosensitive optical fibers. The refractive index of photosensitive glass optical fibers may be changed by actinic radiation- that induces localized alterations of the glass structure. The term "actinic radiation" includes visible light, UV, IR radiation and other forms of radiation that induce refractive index changes in the glass. Introduction of changes in refractive index occurs by exposure of a photosensitive glass fiber to an interferogram of UV radiation. The period of the resulting fiber Bragg grating in the fiber corresponds to the period of the interferogram scaled by the refractive index of the waveguide.

To function as a dispersion compensator, the grating period of an FBG is chirped to reflect lagging wavelengths before faster wavelengths, which must travel further into the grating before they are reflected. An optical circulator separates the input of a dispersion compensation module (DCM) from the output. A dispersion compensating grating (DCG) module recompresses a data pulse that had been corrupted by chromatic dispersion and as a result, the optical system performance is enhanced. The longer the grating, the greater the DCG compression factor and the wider the bandwidth of the device.

Long length gratings for dispersion compensation are not readily available, since extreme tolerances must be maintained to manufacture quality long length gratings. Fabrication errors in chirped gratings create unwanted variations in the group delay curve, called group delay ripple, and thus inaccuracies in the dispersion correction. The impact of these ripples on optical system performance is poorly understood, but some system designers have predicted the need for these ripples to be less than ~40 ps peak-to-peak for a DCG to be useful as dispersion compensator in most optical transmission systems. However, the magnitude of the ripple needed to make a useful FBG dispersion compensation device has not been verified. A ripple amplitude of ~40 ps peak-to-peak can be caused by a 20% variation in the FBG UV-induced index change, a ~0.3% dimensional change in a fiber core, or a ~4 pm error in grating pitch. Since the inter-atomic spacing between silicon and oxygen atoms in glass is ~160 pm, holding required tolerances during grating inscription is viewed as highly unlikely. This view identifies fiber fabrication tolerances as the limiting factor to the production of quality wide-band dispersion compensation gratings.

In 1995, a Swedish research group reported the fabrication of a long-length FBG by "stitching" smaller FBGs together. A small grating was written, the fiber was translated by a grating period through a UV-interferogram with a high-precision linear stage, and then the fiber was irradiated again. This process was continued until gratings of extended length, up to 50 cm were made. The range of motion of available high-precision staging limited the length of these FBGs. Other reports alleged manufacture of long length dispersion compensation gratings included irradiation of up to 2.5 meters of an optical fiber through a number of phase masks aligned sequentially along the length of the fiber. A similar process involved the use of a phase mask formed in the periphery of a disk. During rotation of the disk, ultraviolet radiation passing through the phase mask was expected to produce refractive index changes in an optical fiber as the rotating disk traversed a length of the optical fiber. Difficulties of rotational registration to produce a continuous length of phase mask apparently made this method impractical.

Stitching methods require precise knowledge of optical fiber location relative to the interferogram used to produce a long length FBG, otherwise group delay ripple characteristics are too large for effective dispersion compensation in optical communication systems. Precise positioning between a phase mask and an optical fiber depends upon the accuracy of the motion stage encoder, which suffers from interpolator inaccuracies, noise in edge detection electronic circuitry and random fluctuations in received interpolator laser light. Several feasibility studies have been completed where long-length FBGs, fabricated by stitching, have been used successfully at specific wavelengths as dispersion compensators in optical communication systems. Since the FBG delay ripple imposed very large distortion-derived system penalties at most wavelengths, the wavelength of the transmitting laser in the communication system had to be adjusted in these studies to obtain reasonable system performance.

A common procedure for determining chromatic dispersion of a device is the modulation-phase shift method, as described in Chapter 12 of Fiber Optic Test and Measurement (ed. D. Derickson, Prentice Hall PTR, N.J., 1998, ISBN #0-13-534330-5). The output of a narrowband, tunable optical source is intensity modulated and applied to the device under test. The transmitted (or reflected) signal is detected and the phase of its modulation is measured relative to the electrical modulation source. The phase measurement is repeated at intervals across the wavelength range of interest. The curve of the relative group delay is constructed by accumulating these group delay changes across the measurement wavelength range.

A common procedure for determining system power penalty of a device is described in Chapter 8 of Fiber Optic Test and Measurement (ed. D. Derickson, Prentice Hall PTR, N.J., 1998, ISBN #0-13-534330-5). The system power penalty is the difference in detector power level needed to maintain a given bit-error-ratio (BER) before and after placing an optical device in an optical transmission link. Signal distortion attributable to the structure of the dispersion compensating fiber grating accounts for this power difference after subtraction of optical insertion loss differences.

The group delay ripple is determined by fitting with least squares minimization a line or a low-order polynomial to the relative group delay curve, and then subtracting the polynomial from the curve. The remainder of the subtraction is the delay ripple. Typically this ripple is considered as being "high frequency" ripple, i.e. ripple with a periodicity of less than the channel bandwidth of a communications system, and "low frequency" ripple, i.e. ripple with a periodicity greater than that of a channel bandwidth. Herein high-frequency ripple will be considered as ripple with a periodicity of less than 80 pm (10 GHz at ~1550 nm), and low-frequency ripple will be a ripple with a periodicity of greater than 80 pm. The high-frequency ripple adds an intra-pulse distortion to a communication signal that is difficult to correct, thus the high-frequency ripple is considered more critical than the low-frequency ripple, which merely adds a slight error to the dispersion correction.

Establishing a correlation between delay ripple amplitude and optical system performance has been confusing because different groups measure DCG characteristics in different manners and, often, are not explicit about their measurement procedures. The severity of optical phase fluctuations induced by a component is usually specified in terms of the group delay ripple, e.g. as a peak-to-peak value. However, the system performance degradation from a group delay ripple depends strongly on the period of the ripple. A characteristic period may not exist or may not easily be identified from a measured group delay response. The group delay fluctuations have two separate and independent effects. Part of the fluctuations that are at the order of the signal bandwidth affect the signal spectrum by imposing an average chromatic dispersion, whereas the remaining fluctuations, which contain higher order frequency variations, distort the signal electrical field in a similar way to spectral phase noise. The induced average dispersion is found as a linear fit to the group delay within the signal bandwidth. The remaining fluctuations cause a system penalty, which is proportional to the variance of the residual phase fluctuation within the signal bandwidth.

Phase ripple information may be extracted in the following manner. The group delay values, $\tau_{exp}$, are measured in wavelength steps of $\Delta\lambda$, e.g. by the modulation phase shift method. The first step is to obtain the actual, undesired fluctuations, $\tau_{fluct}$, that are to be analyzed. This is found by subtracting the ideal group delay, $\tau_{ideal}$, for which the chirped grating was designed, from the measured group delay:

$$\tau_{fluct} = \tau_{exp} - \tau_{ideal} - \tau_0.$$

The constant $\tau_0$ defines an arbitrary fixed group delay. The ideal group delay of the grating is calculated as $$\tau_{ideal}(\lambda) = D(\lambda_0)(\lambda - \lambda_0) + \frac{S}{2}(\lambda - \lambda_0)^2,$$

where $D(\lambda_0)$ is the target dispersion at a reference wavelength, $\lambda_0$, and S is the (constant) target dispersion slope $(dD/d\lambda)$ of the dispersion compensation module (DCM). A sliding sinc-function window centered at wavelength $\lambda_c$ and with a width of the signal bandwidth (~20 GHz bandwidth for a 10 Gb/s signal), is applied to the group delay fluctuations, $\tau_{fluct}$. At each position, the group delay fluctuations within this weighted window are evaluated to extract the residual dispersion and the standard deviation of the residual phase.

Although several studies have demonstrated that DCGs could be used as dispersion compensators for a single communication channel, useful wide bandwidth devices have not been demonstrated, mainly because the phase ripple amplitude of these devices was too large. Widely chirped DCGs with several WDM channels operating across their bandwidth have been demonstrated, but because the wavelength of the transmitting laser in the communication system needs adjustment in all of these studies to obtain reasonable performance, these DCGs proved to have only very narrow sections of usable bandwidth across their entire bandwidth. If a wideband DCG with a large phase ripple is useful only over a very narrow range as a dispersion compensator, then the utility of this widely chirped device is lost. Others have demonstrated DCGs in laboratory systems where DCGs have been used to correct the dispersion in several channels of a communication system, but a DCG that covers only part of a communication band has limited appeal, since the system must be specially engineered to accommodate such a device. Gratings with a bandwidth of at least a third of a communications band (~10 nm) or half a band (~15 nm) have some appeal, since fewer accommodations for the device must be made to use it in a communications system than narrower devices.

Although used widely today to solve chromatic dispersion problems in high-speed optical communications systems, new dispersion compensating fiber (DCF) designs have a requirement to match characteristics of dispersion and dispersion slope of opposite sign to those of a given transmission fiber. Typically, DCF designs don't exactly match the dispersion characteristics of their intended fiber and thus leave a residual dispersion that accumulates over multiple spans of transmission fiber. Since DCF designs can be complicated and difficult to manufacture, several transmission fibers do not yet have a matching DCF counterpart. In some cases, fabrication of a matching DCF appears unlikely for use across a wide bandwidth.

Table 1 includes commonly used optical transmission fibers, identified by type and supplier.

TABLE 1

Optical Fibers for Telecommunication Systems

| Fiber Type | Supplier | Dispersion (ps/nm) | Dispersion Slope (ps/nm$^2$) | κ (nm) |
|---|---|---|---|---|
| SMF-28 ™ | Corning, Inc. (Corning, NY) | 17 | 0.058 | 298 |
| LEAF ® | Corning, Inc. (Corning, NY) | 4.2 | 0.085 | 50 |
| Truewave ®-RS | Lucent (Holmdel, NJ) | 4.5 | 0.045 | 100 |
| TeraLight ™ | Alcatel, Inc. (Nozay, France) | 8 | 0.057 | 140 |

The net dispersion, $D_{net}$, and the dispersion slope, $S_{net}$, of a transmission fiber span with a dispersion compensation module can be defined as:

$$D_{net} = D_{tr} + D_{DC}$$

$$S_{net} = S_{tr} + S_{DC}$$

where $D_{tr}$ and $S_{tr}$ are the dispersion and dispersion slope of the transmission fiber, and $D_{DC}$ and $S_{DC}$ are the dispersion and dispersion slope of the dispersion compensation module. To describe the amount of dispersion and dispersion slope requiring compensation, a parameter κ is commonly defined, which is the ratio of the dispersion D over the dispersion slope S, i.e., κ=D/S. To simultaneously compensate the dispersion and the dispersion slope of the transmission fiber, $κ_{tr}=κ_{DC}$ at every wavelength. It is difficult to match the κ value at every wavelength due to the curvature of dispersion in both the transmission fibers and DCF-based dispersion compensation modules. The above table compares the values of dispersion, dispersion slope and dispersion/slope ratio of different types of fibers at 1550 nm. These fibers have κ values ranging from about 50 nm to about 300 nm, which means they need different amounts of dispersion and dispersion slope compensation.

There thus exists a need for wide bandwidth (i.e., greater than several WDM channel spacings and preferably a full communications band) dispersion compensation module, using a single chirped FBG that can compensate for the chromatic dispersion and dispersion-slope in lightwave communications systems across an entire bandwidth. There also exists a need in the art for a wide-bandwidth chirped fiber Bragg grating that has a low phase ripple amplitude. These and other needs are met by the present invention, as hereinafter described.

SUMMARY OF THE INVENTION

In one aspect, the present invention relates to a device used for chromatically dispersing lightwave signals in fiber optics and to a method for using this device to achieve chromatic dispersion. The device comprises a full-bandwidth chirped fiber Bragg grating with low optical phase distortions. These devices are useful as chromatic dispersion correction devices in high frequency (e.g., 10 Gbit/s) optical communications system. In contrast to previously known devices used for this purpose, these devices do not exhibit large fluctuations in system performance penalty across their bandwidth.

In another aspect, the present invention relates to a method and apparatus for fabricating long length FBGs. In accordance with this aspect of the invention, the fiber Bragg grating writing process uses an optical fiber translated with ~1 ppm ($10^{-6}$) velocity control. This is preferably accomplished by placing the fiber into a helical groove on a spool that is mounted to a rotary spindle. The spindle is rotated at a constant velocity, which is preferably regulated by a large flywheel. The groove on the spool acts like a thread on a screw so that, as the spindle turns, a linear stage is used to track the laser beam on the fiber, in a manner analogous to cutting the threads of a bolt on a lathe. It is possible to fabricate long length gratings greater than 10 meters long using this method.

More particularly, the present invention provides a refractive index grating for dispersion compensation of a plurality of optical signals passing through an optical transmission line. The refractive index grating comprises a photosensitive optical fiber including a long length, chirped Bragg grating providing dispersion compensation over a wide bandwidth of optical signals. The long length chirped Bragg grating has a reflection bandwidth and a weighted phase ripple amplitude wherein the reflection bandwidth has a full-width at half maximum that is greater than 25 nm, and the weighted phase ripple amplitude is less than about 300 milliradians.

The present invention also provides a device for dispersion compensation of a plurality of optical signals passing through an optical transmission line. The device comprises a circulator and a photosensitive optical fiber including a long length, chirped Bragg grating providing dispersion compensation over a wide bandwidth of optical signals. The long length chirped Bragg grating has a reflection bandwidth greater than about 25 nm, and further has reduced distortion at a bit rate of about $10^{-9}$. This reduced distortion leads to a power penalty of less than 3 dB during less than 25 nm stepwise changes in wavelength of the plurality of optical signals across the wide bandwidth. The device provides a dispersion greater than about 100 ps/nm in a optical transmission line operating at 10 Gbit/s.

A process, according to the present invention, provides a refractive index grating for dispersion compensation of a plurality of optical signals passing through an optical transmission line. The process comprises a number of steps including providing a photosensitive optical fiber mounted in a helical groove that opens to a surface of a spool. After attaching the spool to a flywheel, the spool and flywheel are rotated to provide rotational inertia from about 200 g.cm² to greater than 700 g.cm². During rotation, exposure of the photosensitive optical fiber to a pattern of ultraviolet radiation passing through a phase mask provides the refractive index grating that includes a long length, chirped Bragg grating providing dispersion compensation over a wide bandwidth of optical signals. The long length chirped Bragg grating has a reflection bandwidth and a weighted phase ripple amplitude such that the reflection bandwidth has a full-width at half maximum that is greater than 25 nm, and the weighted phase ripple amplitude is less than about 300 milliradians.

DETAILED DESCRIPTION OF THE INVENTION

As used herein, the term "reflection delay ripple amplitude" refers to the characteristic amplitude of a fiber Bragg grating measured by subtracting a sixth-order polynomial from the reflection delay curve measured by the modulation-phase shift method and using a measurement frequency of 250 MHz. Herein high-frequency ripple will be considered as ripple with a periodicity of less than 80 pm (10 GHz at ~1550 nm), and low-frequency ripple will be ripple with a periodicity of greater than 80 pm.

As used herein, the term "full width at half maximum" or "FWHM", when used in reference to a reflection bandwidth, means the range of wavelengths reflected by the device with an amplitude of at least >50% of the maximum reflection amplitude (3 dB points).

A distinguishing feature, according to the present invention, is a, precise FBG fabrication technique that provides long-length, wide-bandwidth, chirped fiber Bragg gratings exhibiting low phase ripple amplitude. Chirped, long-length FBGs according to the present invention may exceed 10 m in length. Fiber Bragg grating fabrication involves a process that translates a fiber at a precise velocity past a stationary interferogram made with a laser beam that is intensity-modulated at frequency f. In this method, the fiber is treated as the recording medium of an analog signal, analogous to magnetic tape recording where a magnetic medium is translated at a controlled velocity past a magnetic circuit writing head. The radiation dose Φ delivered to a fiber along its length x as it is translated at velocity v across the laser beam may be expressed as $$\Phi(x) \propto 1 - \frac{1}{2} \cdot \cos\left[2\pi \cdot \frac{f}{v} \cdot x\right].$$

Assuming that the refractive index perturbation induced in the fiber is proportional to the delivered dose of radiation, a grating of period v/f will be written into the fiber. This result is significant, since the methodology allows for the manufacture of a chirped FBG of virtually any bandwidth by changing the frequency of the light amplitude modulation or the velocity of the fiber. Complex FBGs can be written into the fiber simply by programming that function into the computer that controls the laser beam modulation.

Past approaches have relied on measuring with extreme accuracy the position of a fiber relative to an interferogram to stitch gratings together. However, the accuracy of location measurements is limited by the motion stage encoder—usually interferometer based—which is susceptible to several degradations, such as interpolator inaccuracies, noise in edge detection electronic circuitry, and random fluctuations in received interpolator-laser light. The advantage of the present technique over previous methods is that it is a velocity-controlled approach that does not require position information for feedback, and thus is not limited by the throw of available high-precision motion staging.

Figure 1:
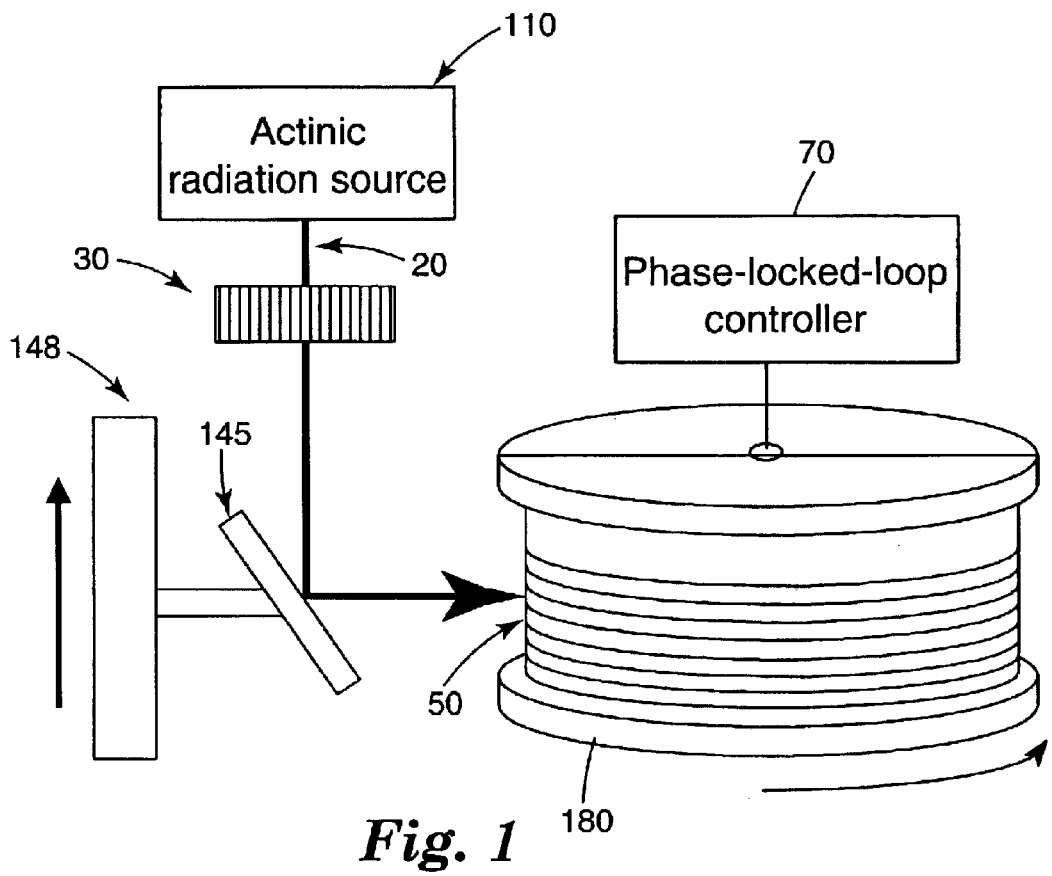
FIG. 1 is a schematic diagram of a long length fiber Bragg grating fabrication system.

Referring to FIG. 1 the accuracy requirement for fabricating quality DCGs, relies upon fiber translation with ~1 ppm ($10^{-6}$) velocity control. This is preferably accomplished by placing the fiber into a helical groove 50 on a spool 180 that is mounted to a rotary spindle. Spindle rotation at a constant velocity, preferably using a large flywheel, to regulates the speed of the spool. The groove on the spool acts like a thread on a screw so that, as the spindle turns, a translation motion stage is used to precisely locate the laser beam on the fiber, in a manner analogous to cutting threads on a lathe. It is possible to fabricate long length gratings tens of meters long using this method. To meet the tolerances needed to fabricate DCGs, the spool diameters are preferably machined with a precision of <10 millionths of an inch (250 nm).

Figure 2:
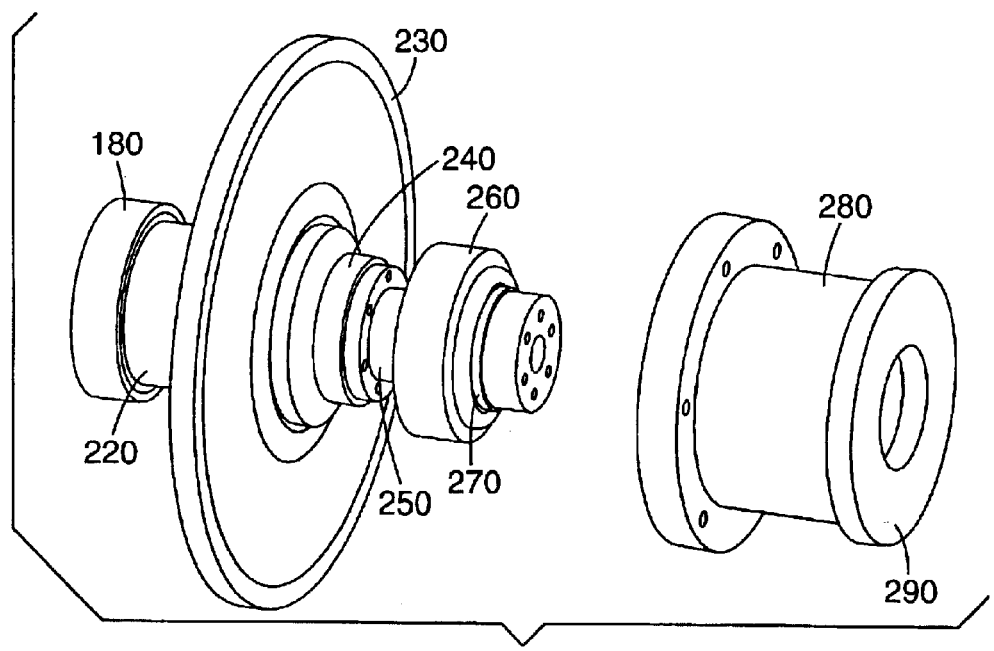
FIG. 2 is a schematic diagram of the motor system used to rotate the helical spool at a constant angular velocity.

FIG. 2 shows a detailed view of the machine used to rotate the spool 180 at a constant angular velocity. An air bearing 240 provides the point of rotation, which is mounted to an outside fixed housing 280. A flywheel 230 regulates the rotational speed of the spool 180. A mounting chuck 220 attaches the writing spool 180 to the flywheel 230 and the air bearing 240. The spindle system is driven by an induction motor consisting of a stator 260 that is attached to the outside housing 280 and a rotor made of a high-permeable metal core 250 with a high resistive conductivity metal shell 270 press-fit on it. A rotational encoder 290 is mounted to the housing 280 and the rotor core 250 to provide velocity information to the control electronics.

It has been found that constant velocity can be maintained to a degree that exceeds available position measurements by increasing appropriately the momentum of the motion system to mechanically low-pass filter interpolator errors. It has also been found that the angular momentum of a rotary fabrication system can be increased to reduce the effect of outside disturbances on the fabrication system and produce quality DCGs.

An air-bearing spindle, which exhibits relatively no torque ripple, supports the motor in the fabrication system. Without wishing to be bound by theory, it is believed that turbulence from the air in this spindle (and other vibrations in other support structures) causes errors in the fiber motion and thus compromises the grating quality. The angular momentum L of a symmetrical rigid body may be expressed as $L=I\omega$, where I is the rotational inertia and $\omega$ is the angular velocity of the rotating body. By increasing the system rotational speed and by increasing its rotational inertia, chirped FBGs have been fabricated with decreased delay ripple amplitudes. Preferably, the rotational inertia of the system is at least 1 g cm$^2$, more preferably, at least 10 g cm$^2$, and most preferably, at least 100 g cm$^2$.

In the following examples, the group delay and phase measurements were made with the modulation-phase shift method with a 50 MHz modulation frequency and 1 pm step size, unless otherwise stated. The group delay is the derivative of the phase, and the phase ripple is related to the inter-symbol system penalties in telecommunication.

EXAMPLE 1

This example illustrates the effect of increasing the rotational inertia, and hence the angular momentum, of the spindle used in the DCG fabrication system. For these measurements, a modulation frequency of 200 MHz was used.

Figure 3A:
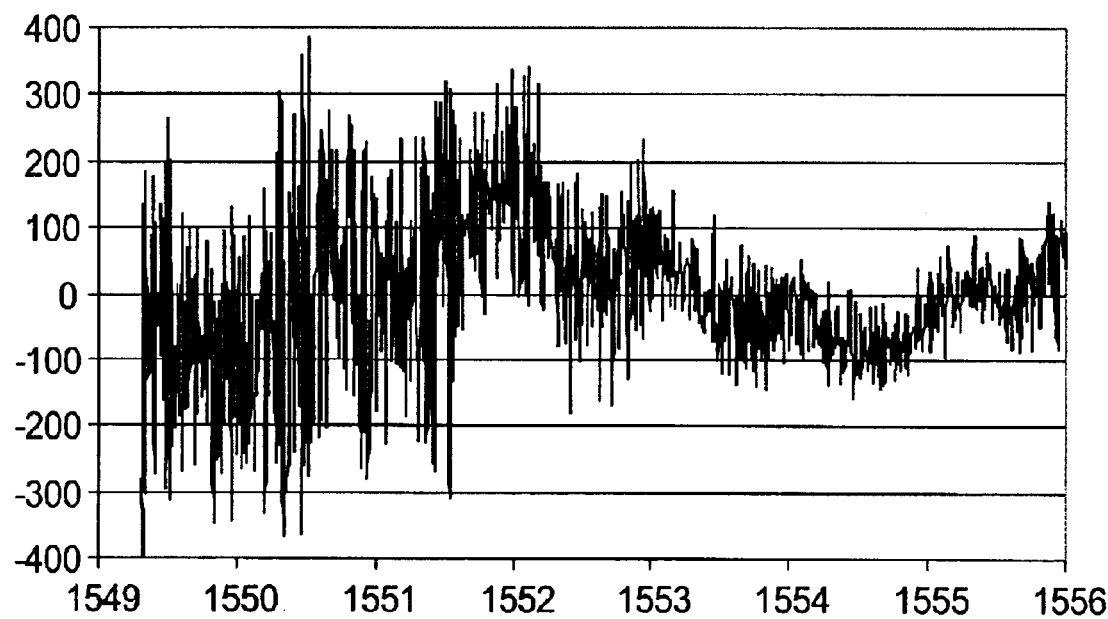
FIGS. 3a and 3b show delay ripple spectra measured from two different gratings fabricated with the system operating at different levels of angular momentum.

Two chirped FBGs were written, and their delay ripple amplitude was analyzed. The fabrication system of the first FBG comprised an induction motor with a smooth-walled rotor supported by an air bearing spindle. The spindle was controlled to rotate at a constant velocity with phase-locked-loop (PLL) electronics that followed a moiré-effect rotary encoder. A spool, with a helical groove to hold the optical fiber, was also mounted to the air-bearing spindle. A spectrum of the delay ripple is shown in FIG. 3a. The delay ripple amplitude was hundreds of picoseconds. The rotational inertia of the first system was ~0.5 g cm$^2$.

Figure 3B:
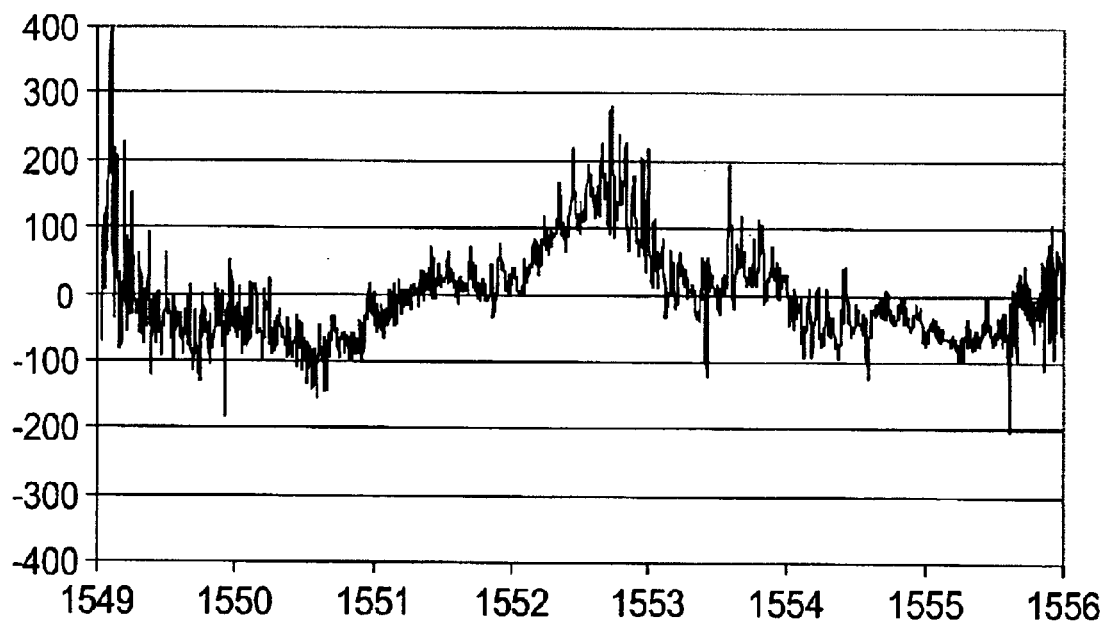

The fabrication of the second fiber Bragg grating was the same as the first, but in this case the rotational inertia of the system was increased 40 times by adding a 40-cm-diameter flywheel to the system. The rotational inertia of the second system was ~220 g cm$^2$. A spectrum of the delay ripple of the second FBG is shown in FIG. 3b. The delay ripple amplitude, attributable to the increased rotational inertia, is substantially reduced from that of the first FBG made without the flywheel.

The gross deviation from the baseline with a periodicity of a few nanometers, or very low-frequency ripple, is due to the poor quality of the encoder used in these experiments and is irrelevant for the point of this demonstration.

EXAMPLE 2

Figure 4:
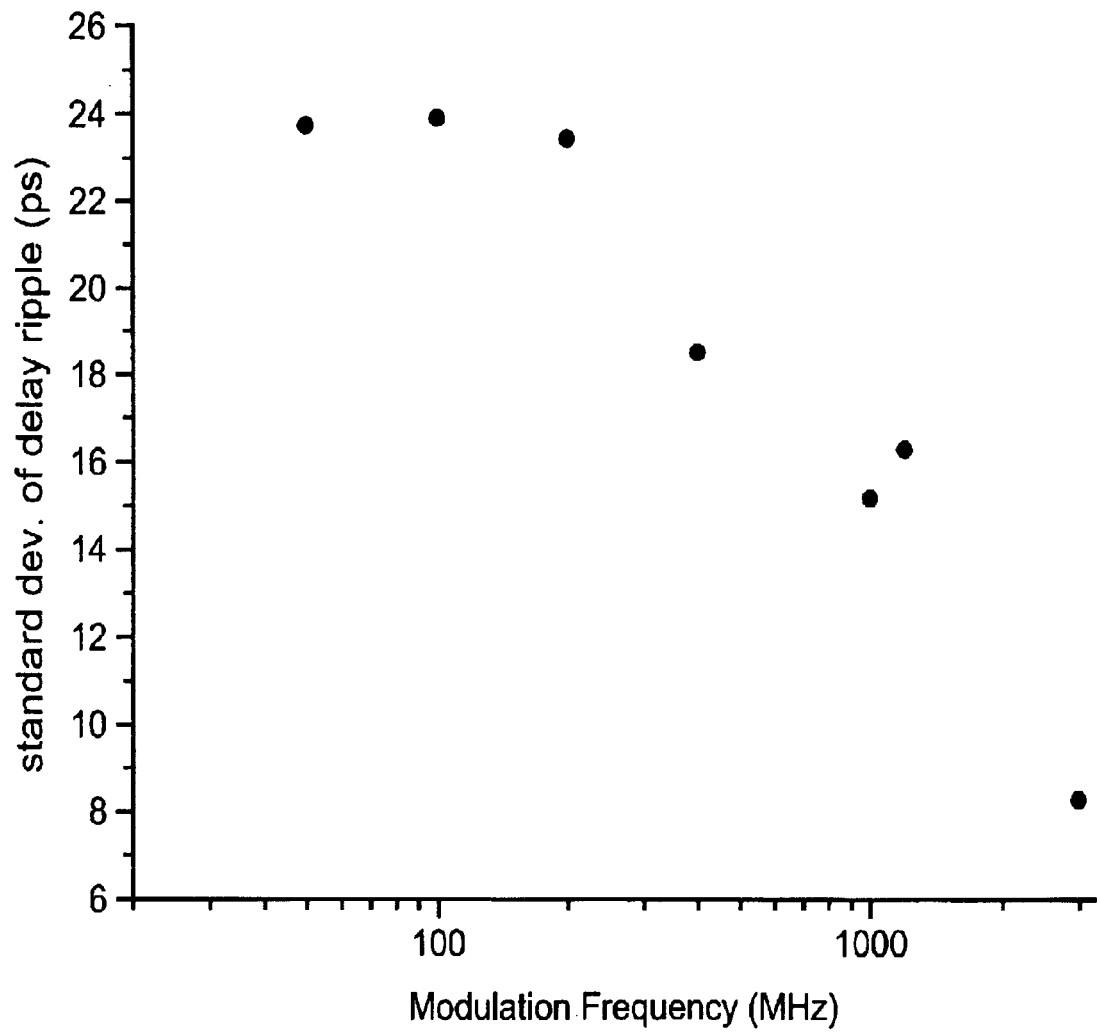
FIG. 4 shows how the measured delay ripple of a grating can vary as a function of the modulation frequency used with the modulation-phase shift measurement method.

FIG. 4 provides measurement of a DCG delay ripple with a modulation phase-shift method that varies according to modulation frequency. Measurements made at 1 GHz, have a ripple amplitude approximately half the amplitude of that measured with a 100 MHz signal. It has been found that measuring the devices with a modulation frequency of <200 MHz gives consistent results. In some cases where the periodicity of the ripple is very fine, a frequency of <50 MHz is needed.

EXAMPLE 3

This example illustrates the improvements in delay ripple amplitude through further increase of the angular momentum of the spindle.

Figure 5:
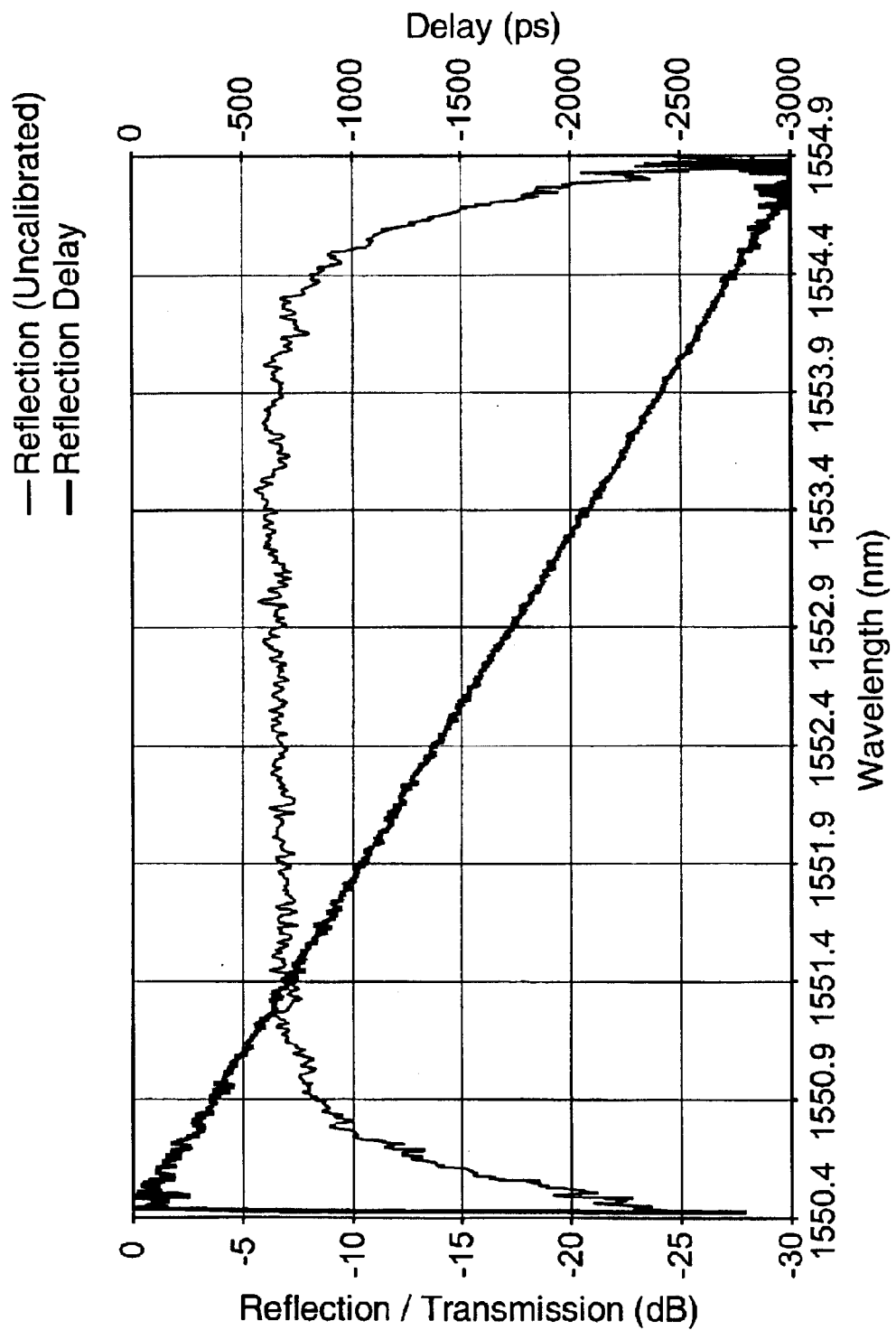
FIG. 5 shows reflection and reflection delay spectra of a high quality chirped long length grating.
Figure 6:
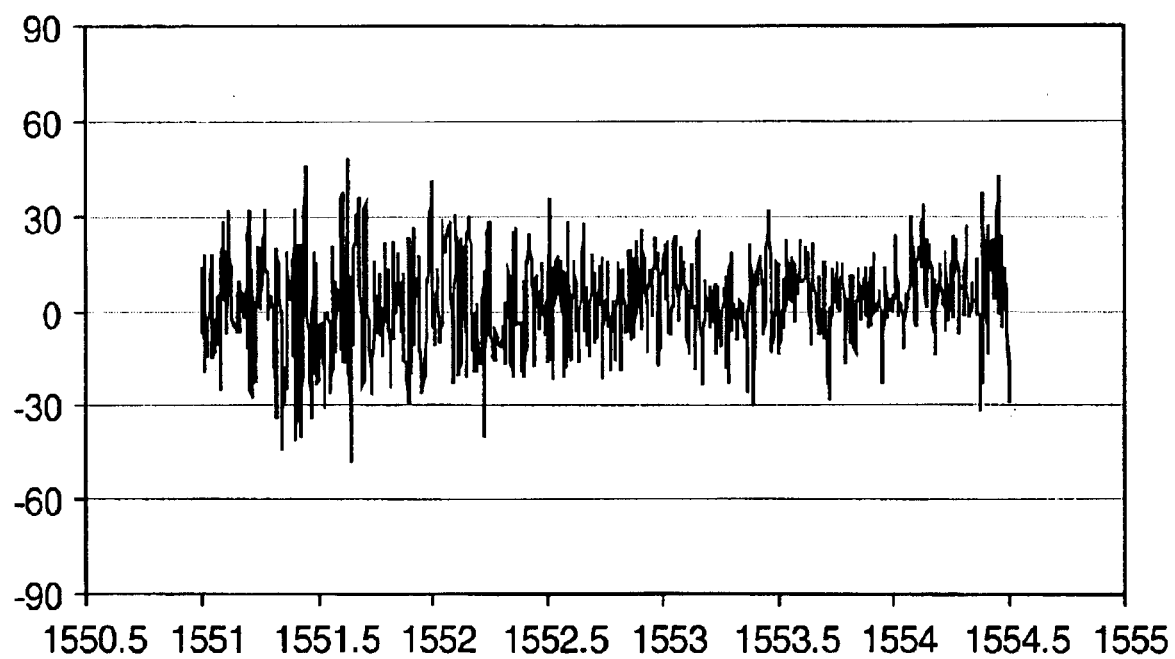
FIG. 6 shows reflection delay ripple spectra of a high quality chirped long length grating.

The fabrication system detailed in Example 1 was modified by installing a heavier flywheel attached to the system to produce a rotational inertia of ~650 g cm$^2$. Gratings were also written at faster rotational speeds to further increase the angular momentum of the fabrication system. The resulting FBGs exhibited delay ripple amplitudes of less than ±30 ps over bandwidths greater than 1 nm. FIGS. 5 & 6 show the reflection, delay in reflection, and delay ripple amplitude of such a grating. For these measurements, a modulation frequency of 200 MHz was used.

EXAMPLE 4

Figure 7:
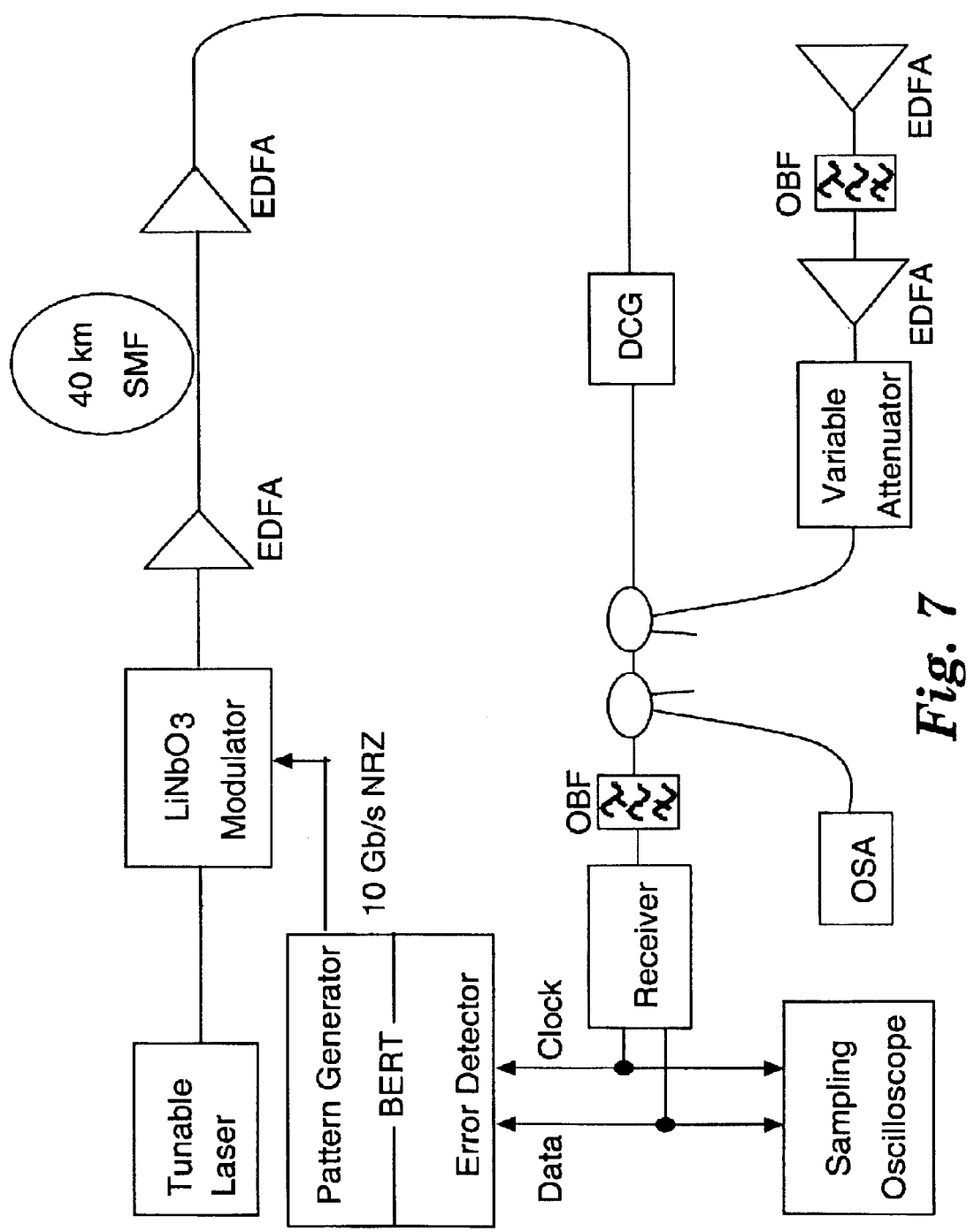
FIG. 7 is a schematic diagram of an optical system.

The performance of the dispersion compensating grating (DCG) was assessed in a fiber optic transmission system. FIG. 7 shows the test configuration consisting of a transmission line of 40 km conventional single mode fiber (SMF) with a nominal dispersion of +17 ps/nm. Light from a commercially available tunable laser with tuning capability in steps of 1 pm was modulated with $2^{23}-1$ pseudo-random binary sequence (PRBS) 10 Gb/s nonreturn-to-zero (NRZ) data via a chirp free external LiNbO$_3$ modulator. The 10 Gb/s optical data output from the modulator was amplified by an Er$^+$-doped fiber amplifier (EDFA) and launched into the 40 km SMF transmission line. The launched optical power into the SMF was kept low (~2 dBm) in order to avoid any possible nonlinear effects. After transmission the signal was again amplified by a second erbium doped fiber amplifier compensating the attenuation in the SMF.

DCGs with a dispersion of −680 ps/nm were placed after the second EDFA to compensate the total accumulated dispersion of the transmission line. The dispersion compensated signal was directed to a 10 Gb/s receiver where the optical data was converted into an electrical 10 Gb/s data stream and a clock signal was recovered. A tunable optical bandpass filter of 0.9-nm bandwidth, which followed the source wavelength, was used before the receiver to suppress the ASE noise outside the signal bandwidth, hence improving the receiver performance.

Figure 8:
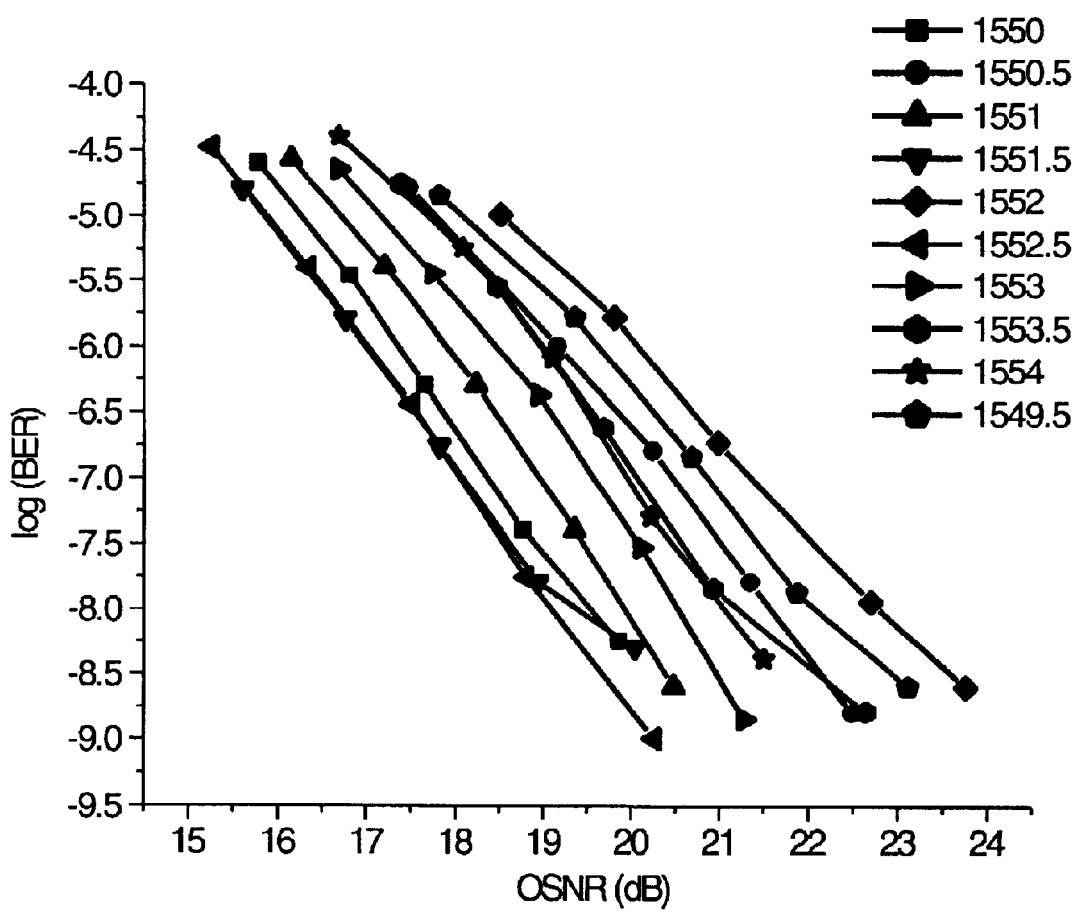
FIG. 8 is a graph that shows the bit-error-rate versus optical signal-to-noise measured in an optical communication system utilizing a low quality fiber Bragg grating as a dispersion compensator.

As an example of a poorly performing DCG, FIG. 8 shows the bit-error-rate (BER) versus optical signal-to-noise ratio (OSNR) where a DCG with ~±50 ps delay ripple amplitude is used as a dispersion compensator in an optical fiber communication system. As the wavelength of the signal is changed slightly, the BER performance at a given OSNR varies by orders of magnitude, rendering the device useless.

Figure 9:
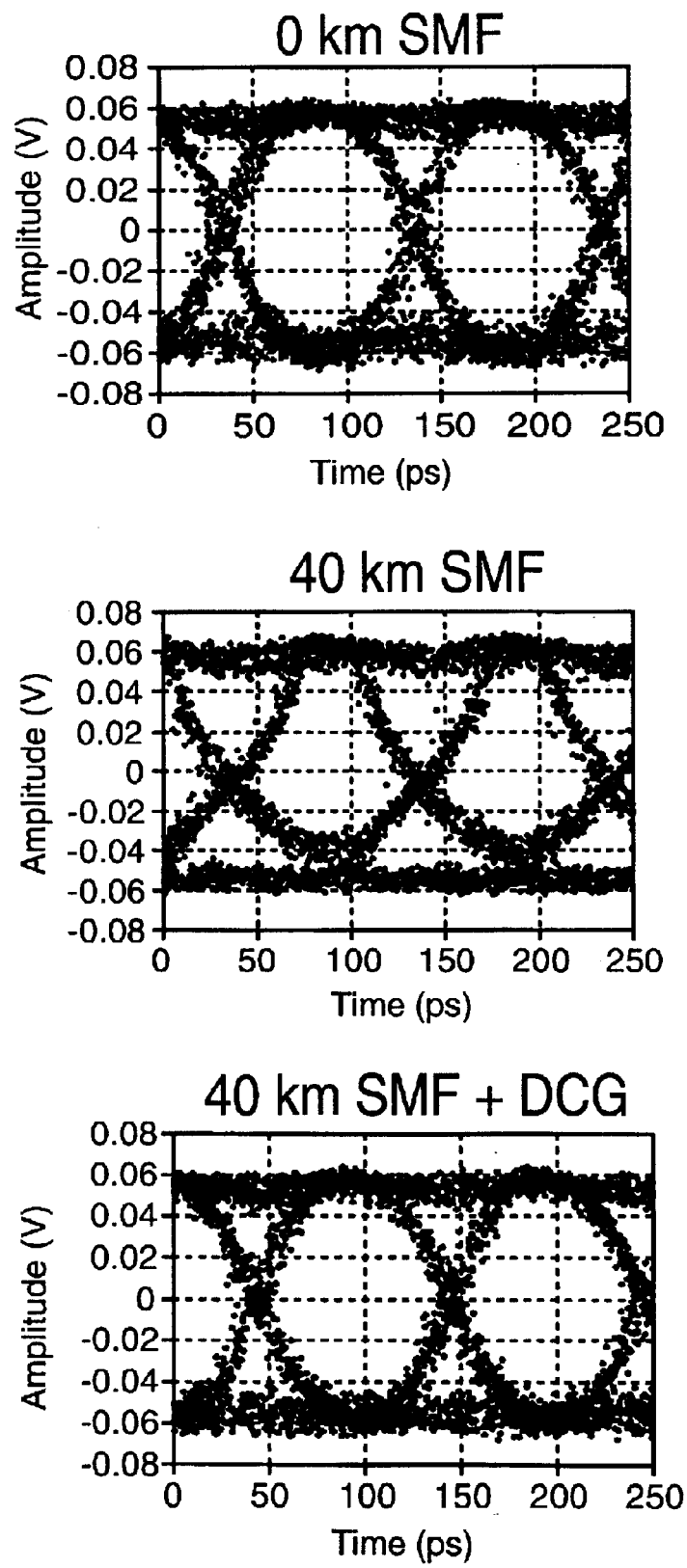
FIG. 9 shows an example eye diagram measured in an optical communication system utilizing a high quality fiber Bragg grating as a dispersion compensator.

In contrast, the DCG having a delay ripple amplitude of <±30 ps, as illustrated in Example 3, was placed in the optical fiber communication system. FIG. 9 shows eye patterns of data signal, recorded with a sampling oscilloscope, at various locations along the transmission line. The dispersion induced eye closure at the end of 40 km of SMF and its complete restoration at the receiver clearly shows the effectiveness of the dispersion compensation by the DCG.

Figure 10:
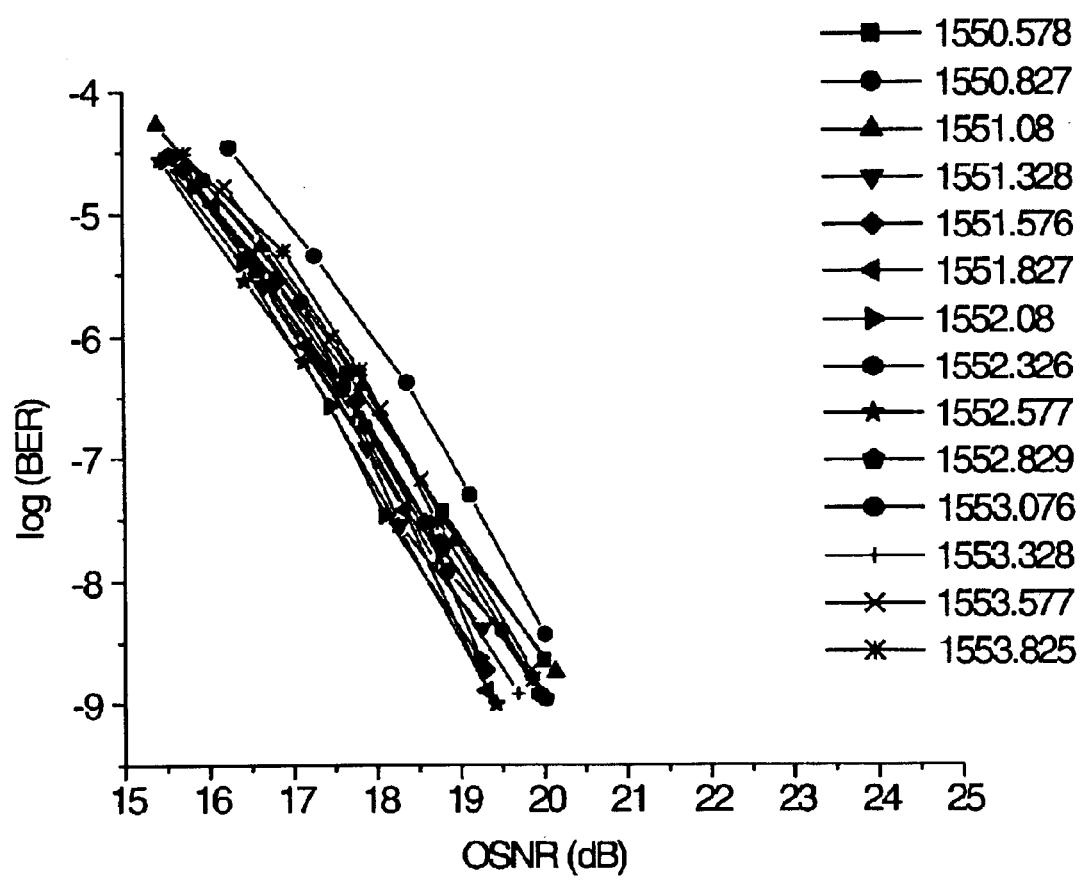
FIG. 10 is a graph that shows the bit-error-rate versus optical signal-to-noise measured in an optical communication system utilizing a high quality fiber Bragg grating as a dispersion compensator.

The uniformity of the DCG performance in the optical fiber communication system was examined by measuring bit-error-rate (BER) as a function of optical signal to noise ratio (OSNR) across the DCG bandwidth. The measurement involved adding noise to the transmitted signal after dispersion compensation, effectively varying the OSNR, and measuring the resulting BER using a 10 Gb/s bit-error-rate testset (BERT). The noise source used in the system was amplified spontaneous emission (ASE) noise generated from a combination of two EDFAs. An optical bandpass filter was used to limit the ASE bandwidth of the first EDFA to match the bandwidth of the DCG. The ASE noise after filtering thus behaves as a pump signal to the second EDFA generating a high power ASE noise within the bandwidth of interest. The ASE noise was summed with the transmitted signal through an attenuator, and the OSNR, measured with an optical spectrum analyzer, was varied by varying the attenuator. FIG. 10 shows the results of these measurements. It can be clearly seen that as the source wavelength was changed across the DCG bandwidth the OSNR needed to obtain a given BER varies by <1 dB. No wavelengths were found throughout the DCG bandwidth that did not operate in a similar manner. Eye diagrams and BER tests are commonly used tools to assess a communications systems performance, as described in Chapter 8 of Fiber Optic Test and Measurement (ed. D. Derickson, Prentice Hall PTR, N.J., 1998, ISBN #0-13-534330-5).

EXAMPLE 5

Figure 11:
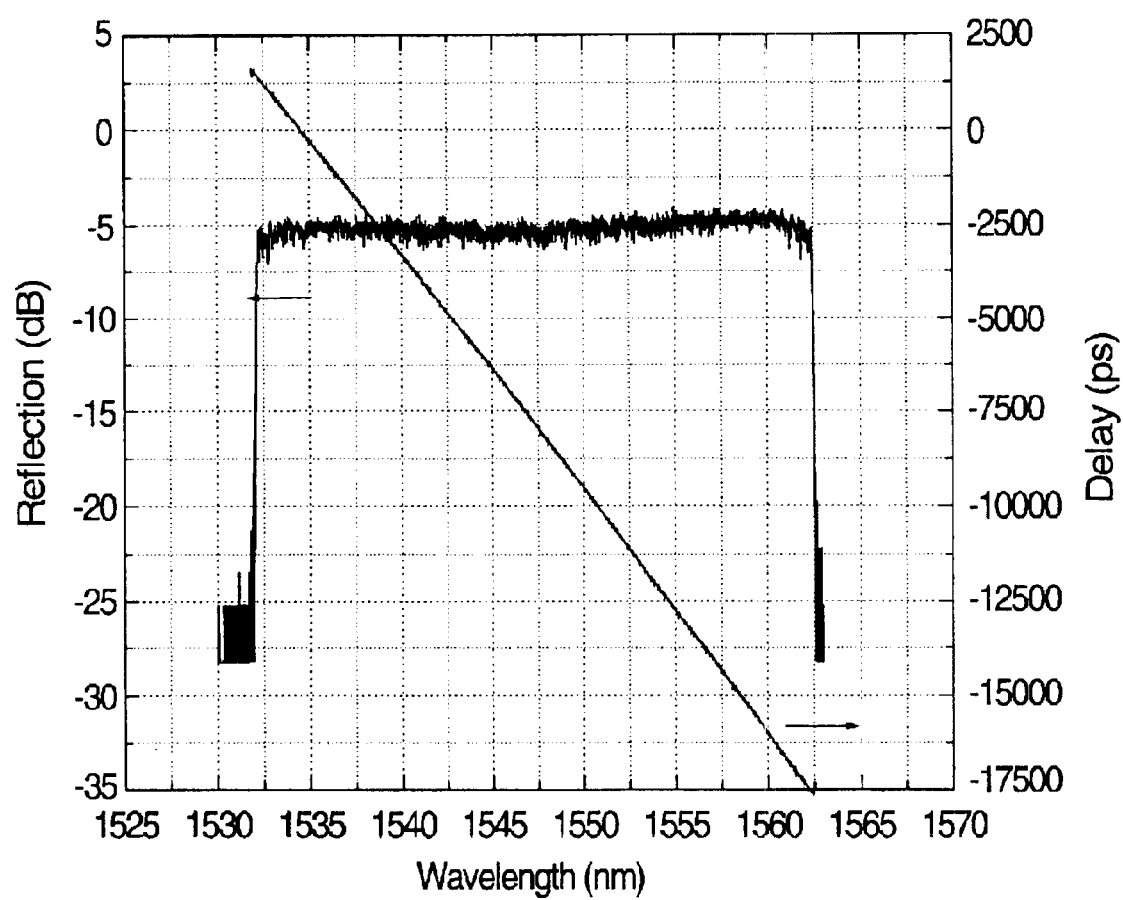
FIG. 11 is a graph that shows reflection and delay spectra of a high quality chirped long length grating of ~30 nm bandwidth.
Figure 12:
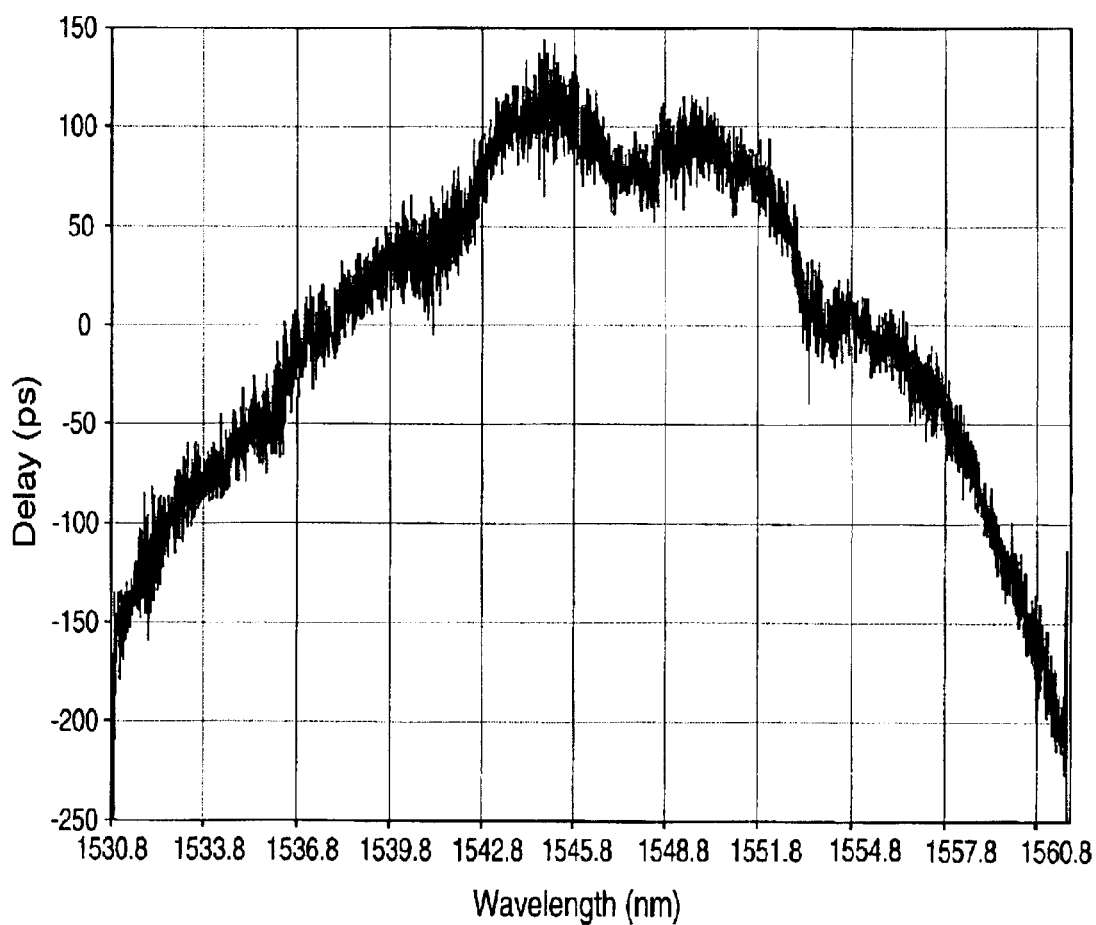
FIG. 12 is a graph that shows the dispersion slope of a high quality chirped long length grating of ~30 nm bandwidth.
Figure 13:
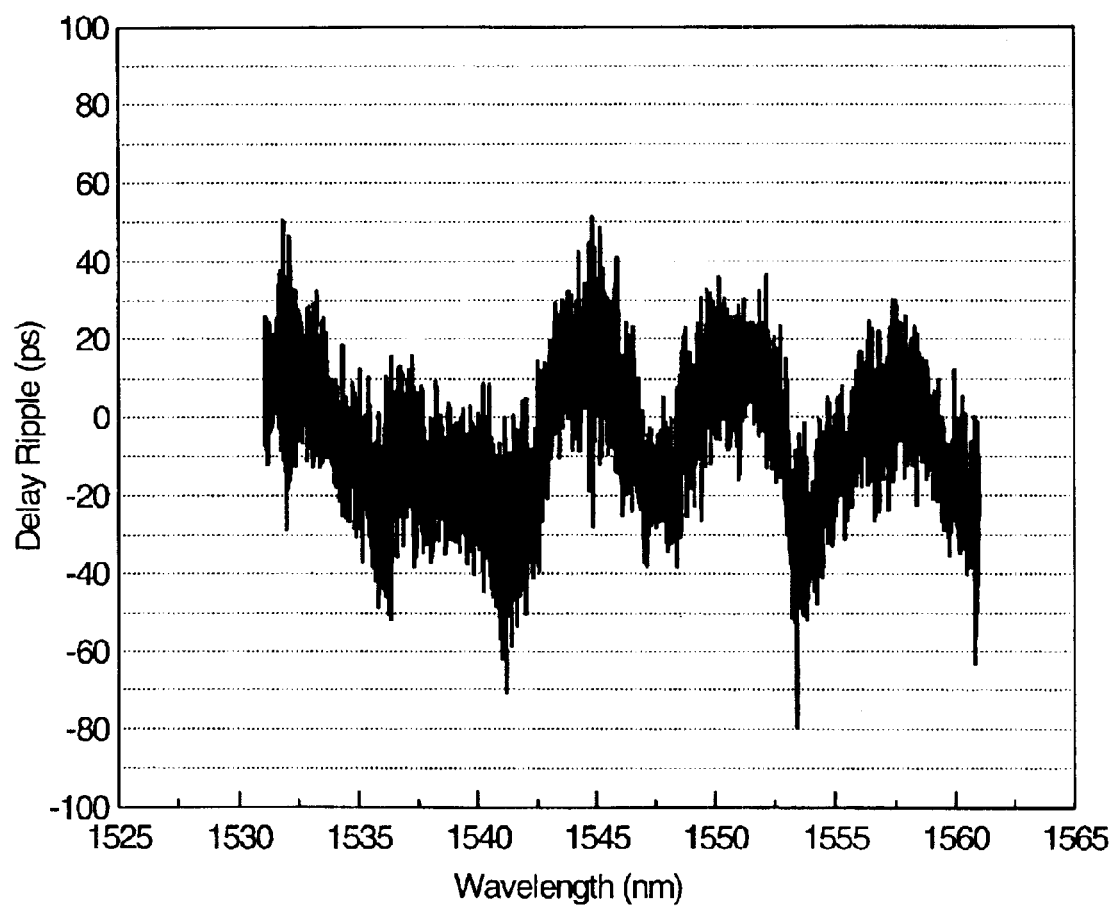
FIG. 13 is a graph that shows the delay ripple of a high quality chirped long length grating of ~30 mn bandwidth.

A wider bandwidth grating was fabricated with the FBG fabrication system described in Example 4. FIG. 11 includes spectra from an exemplary wideband FBG ~2 m long showing the reflectivity and delay of the device. The gross insertion loss of this device is typically ~5 to 5.5 dB (including circulator loss), and the insertion loss variations is ~±1 dB. The insertion loss of the grating measured in transmission is >3 dB. The bandwidth of the corresponding device is >30 nm. After subtracting the linear dispersion of −629 ps/nm from the delay curve, the delay slope of −1.1 ps/nm² remains, as shown in FIG. 12. The delay ripple amplitude remains, as shown in FIG. 13 after fitting a quadratic polynomial to the dispersion slope curve shown in FIG. 12. These measurements were made with the modulation-phase shift method at a frequency of 200 MHz at a ~5 pm resolution. A swept tunable laser system, having a scan rate synchronized with the network analyzer, performed these measurements. Due to the nature of this measurement configuration, the delay ripple amplitude is effectively averaged over a bandwidth of ~5 pm. Note that the high frequency ripple of this dispersion compensation module is less than ±25 ps across large bandwidth regions of the device, and is less than ±40 ps across the FWHM of the device.

Figure 14:
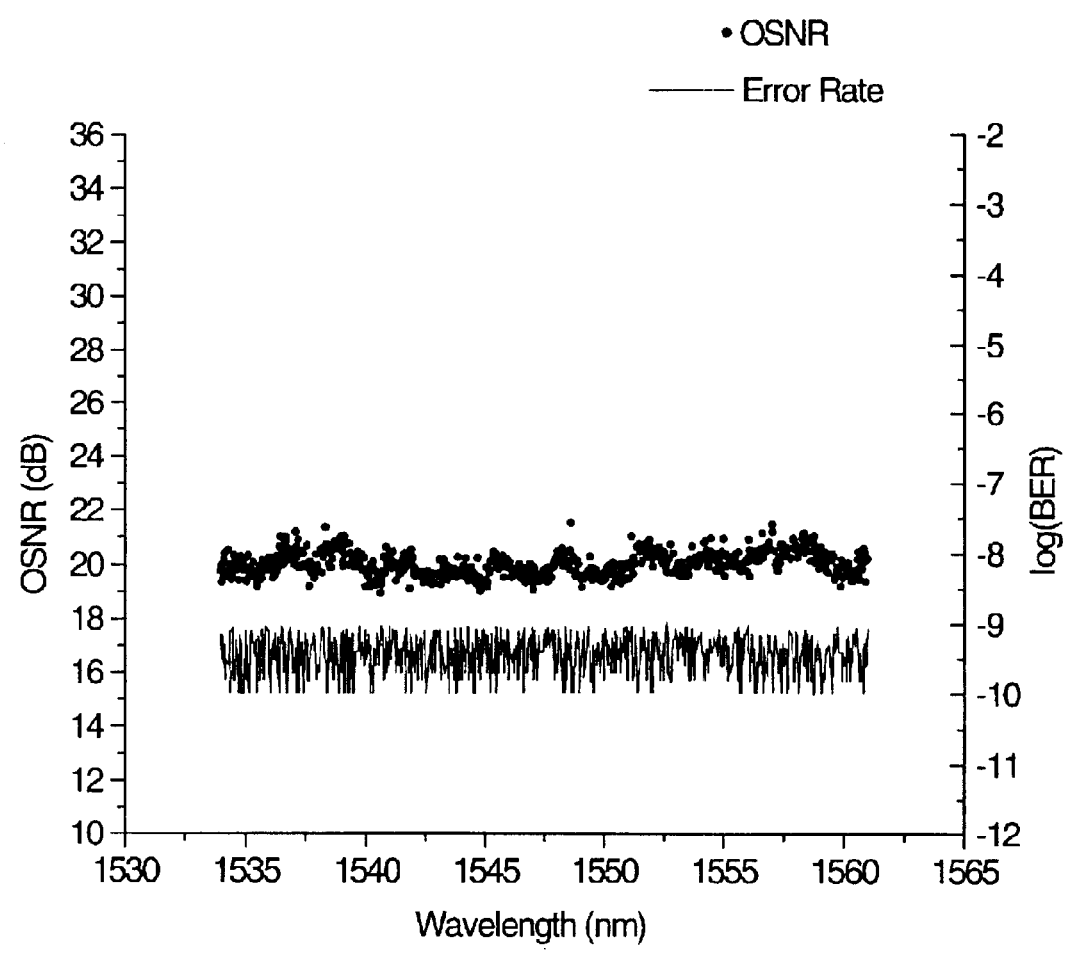
FIG. 14 is a graph that shows the optical signal to noise ratio needed to maintain the bit-error-rate between $10^{-9}$ and $10^{-10}$ across the DCG bandwidth.

The performance of this DCG was assessed in a system test-bed, described in Example 4. The uniformity of the DCG performance in the system is examined by measuring the optical signal to noise ratio (OSNR) required to maintain a fixed bit-error-rate (BER) across the DCG bandwidth. Noise was added to the transmitted signal after dispersion compensation to vary the OSNR, and the BER was determined. As the system wavelength was varied across the DCG bandwidth in 25 pm steps, the noise amplitude was adjusted to keep the BER in the range from $10^{-9}$ to $10^{-10}$. Noise, generated by combining the ASE from two EDFAs, was added to the transmitted signal through an attenuator, and the OSNR, measured with an optical spectrum analyzer, was varied with the attenuator. FIG. 14 shows the OSNR needed to maintain the BER across the DCG bandwidth.

EXAMPLE 6

Figure 15A:
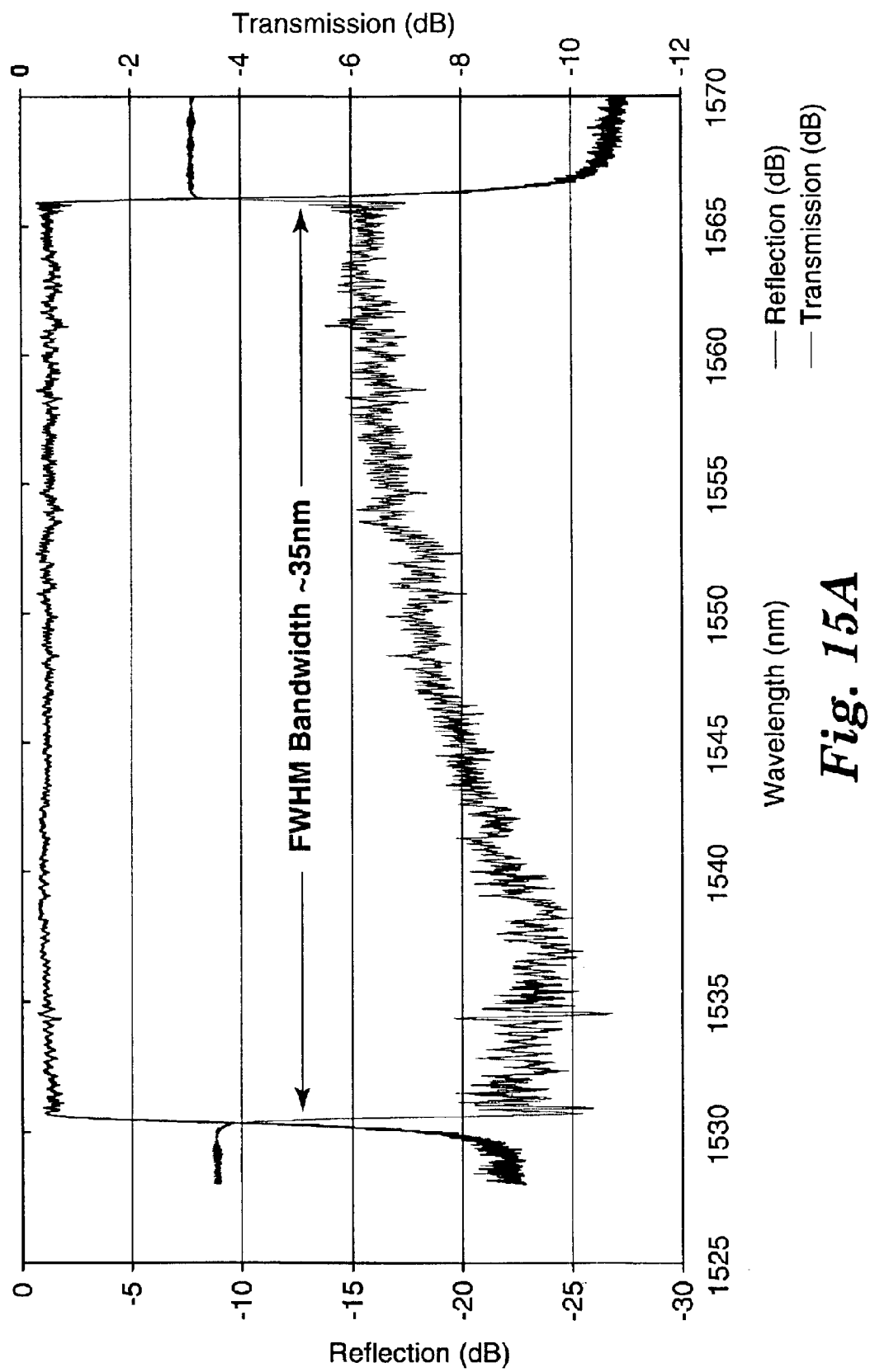
FIGS. 15a and 15b show the reflection from, transmission through, and the reflection delay of a fiber Bragg grating.
Figure 15B:
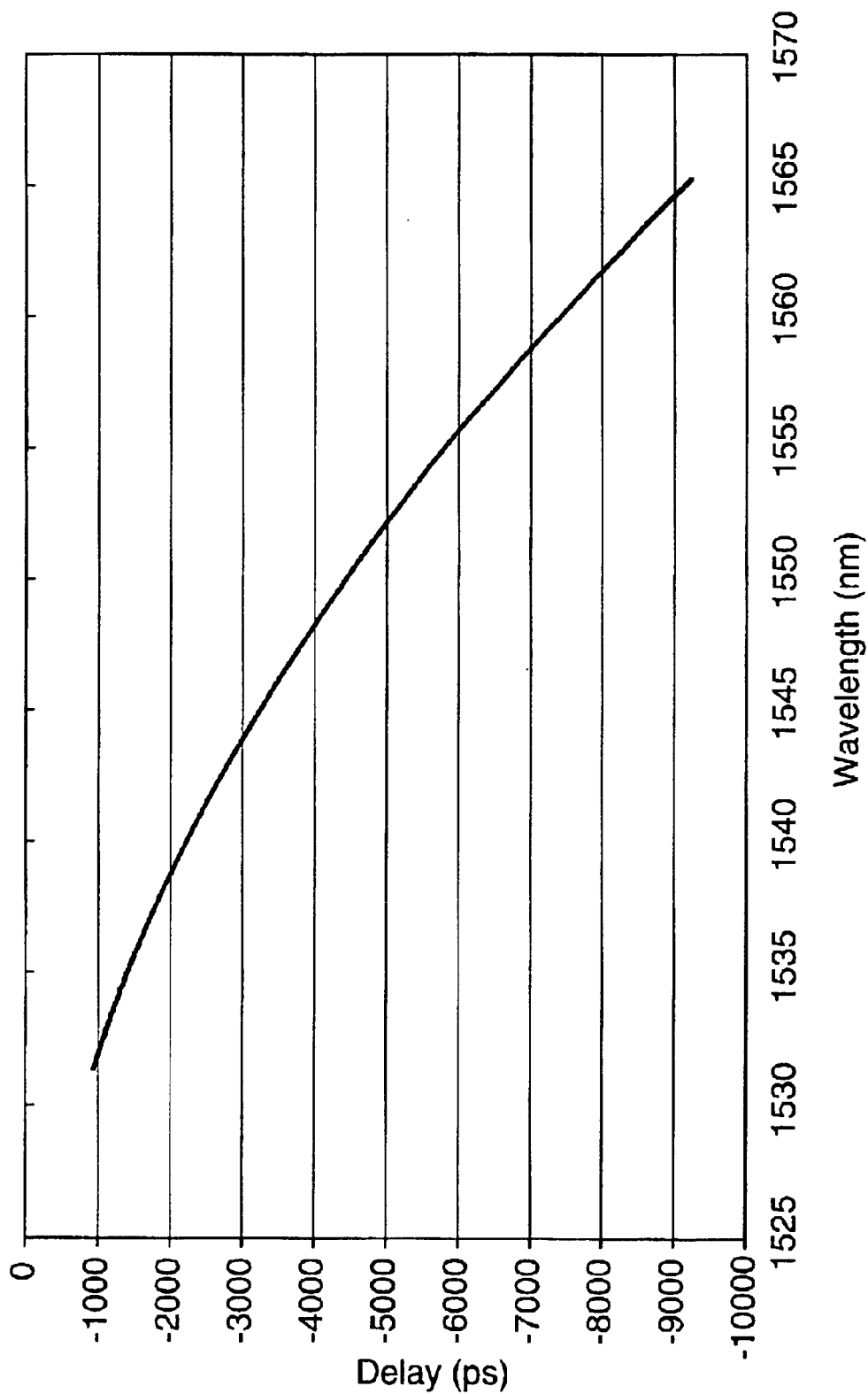
Figure 16A:
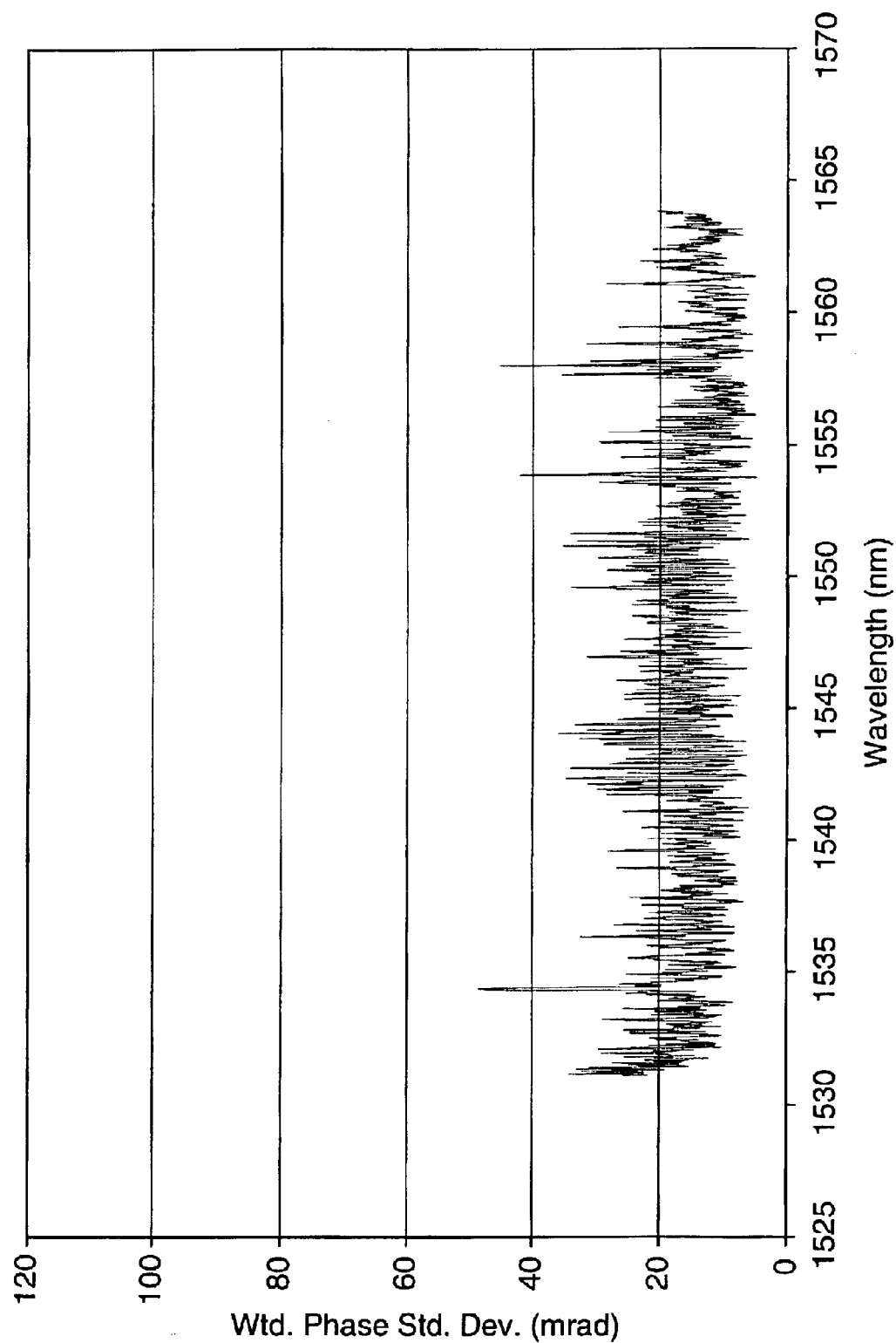
FIGS. 16a and 16b show the reflected weighted phase and raw phase of a fiber Bragg grating.
Figure 16B:
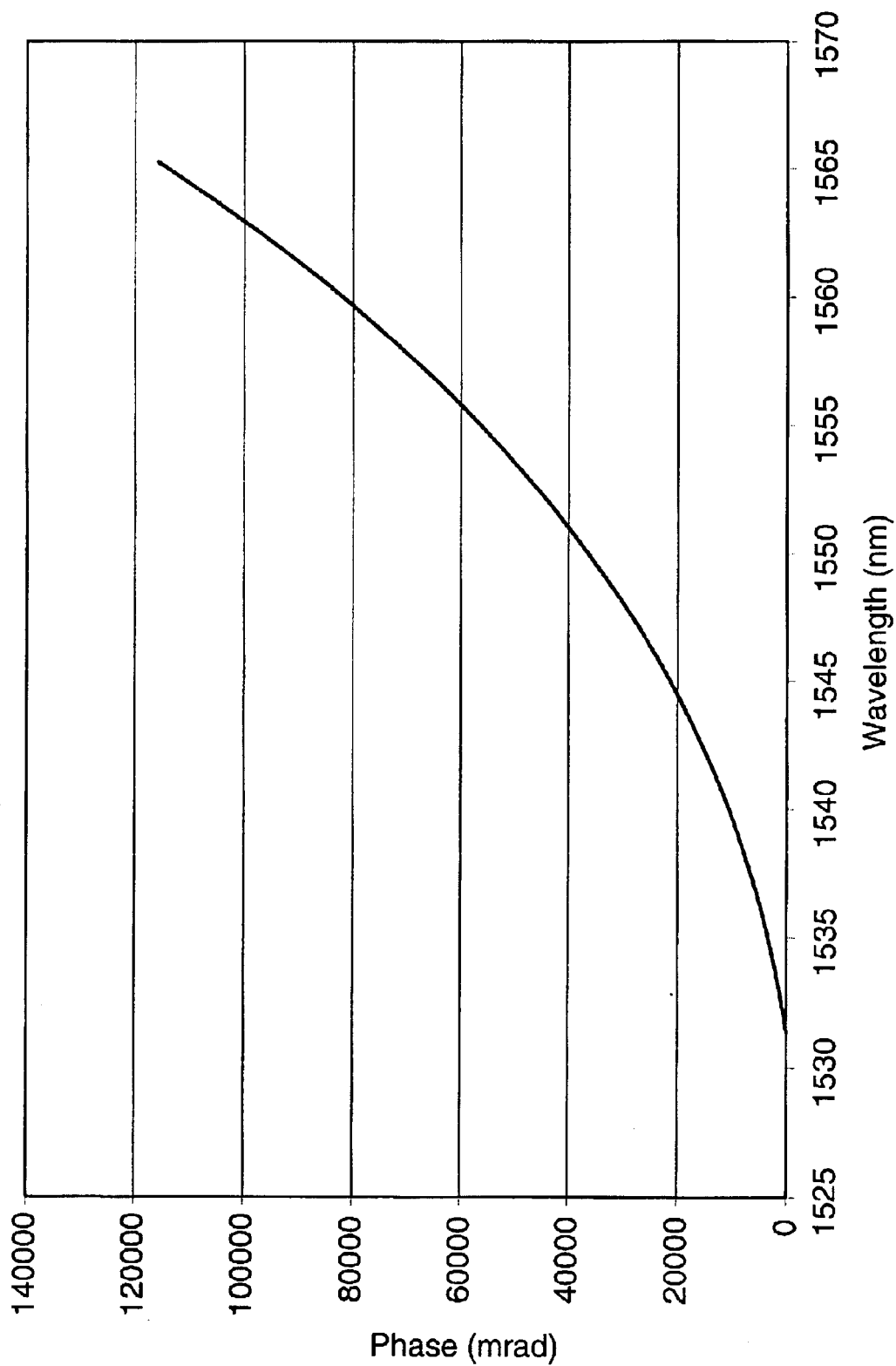

This example illustrates improvements in delay and phase ripple amplitude using a velocity controlled, direct writing method as described previously for fabricating long length chirped fiber Bragg gratings. A FBG was fabricated to match the dispersion characteristics of an 80 km length of LEAF® optical fiber (see Table 1), available from Corning, Inc. of Corning, N.Y., having a central wavelength at ~1546 nm, >30 nm wide bandwidth at 1 dB point, approximately −330 ps/nm dispersion at 1550 nm, and a dispersion slope of approximately −7 ps/nm². The ratio of dispersion to dispersion slope, κ, for this device is ~47 nm. The resulting reflection from and transmission through the resulting grating appear in FIG. 15a. FIG. 15b charts the delay in reflection associated with the same grating. FIG. 16a shows the weighted standard deviation of the phase ripple amplitude across the device bandwidth, and FIG. 16b shows the phase obtained by integrating the FBG delay across the grating bandwidth. The standard deviation of the weighted phase ripple amplitude is <100 milliradians across the full bandwidth of the device.

EXAMPLE 7

The grating of Example 1 was incorporated into a dispersion compensation module (DCM). Performance characteristics of the DCM were assessed in a system test-bed, where the output from a tunable laser was modulated with $2^{23}$—1 PRBS 10 Gb/s NRZ data via an external LiNbO₃ modulator. The 10 Gb/s data stream from the modulator was amplified by an EDFA and launched at a power of ~1 dBm into an 80-km-length ~4.2 ps/nm/km —dispersion optical fiber transmission line. After transmission through the fiber, the signal was amplified, the DCM provides dispersion compensation for the signal before directing it to a 10 Gb/s receiver where the optical data is converted into an electrical data stream. A clock from the data signal was recovered at this point for bit-error ratio (BER) evaluation. Suppression of ASE noise outside the signal bandwidth uses a tunable optical bandpass filter of 0.9-nm bandwidth, precedes the receiver to as a means to improve receiver performance.

Figure 17:
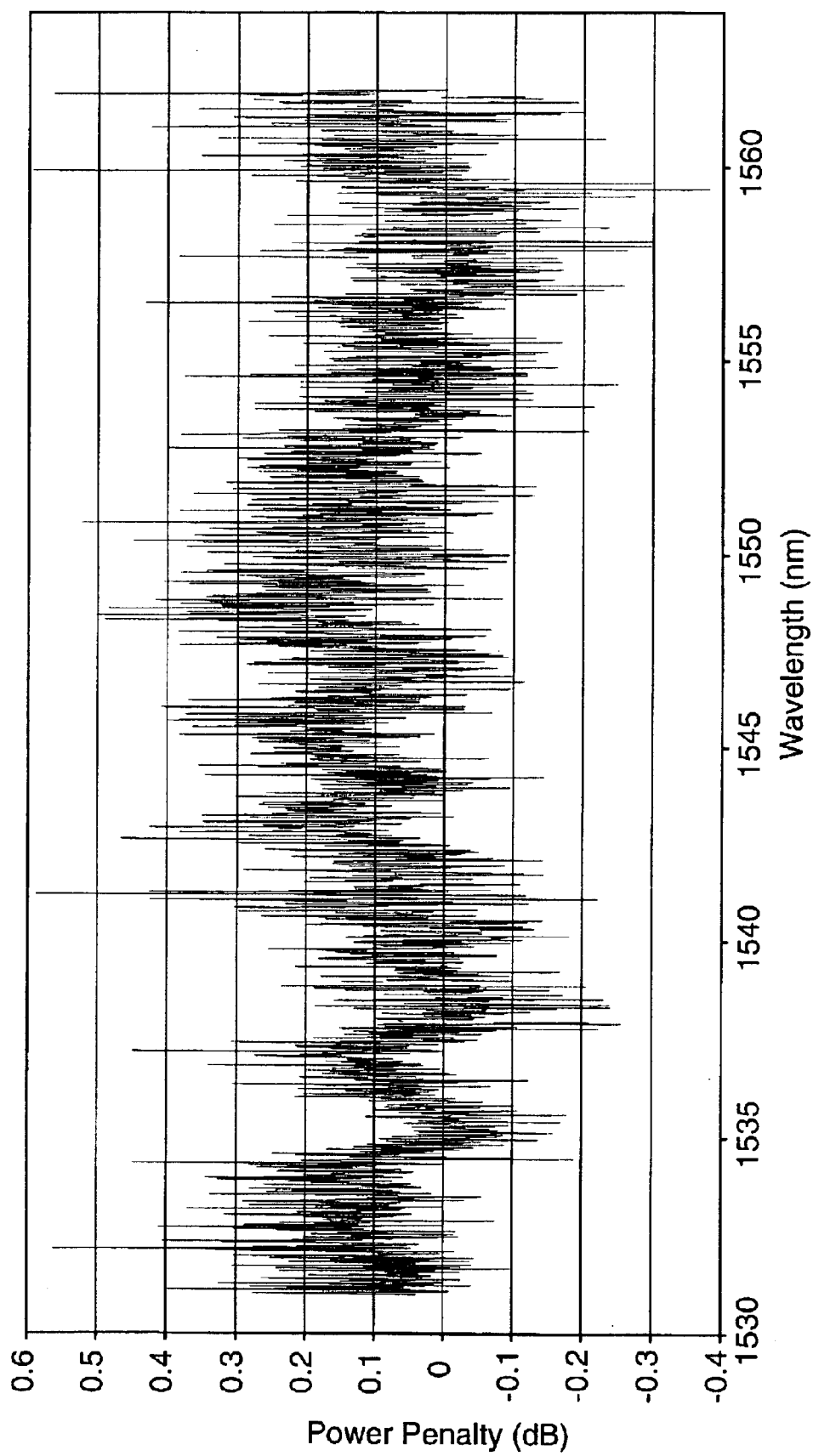
FIG. 17 shows the difference in receiver power needed to maintain a BER of $10^{-9}$ across the bandwidth of a fiber Bragg grating compensated transmission system compared to the back-to-back performance of the system.

The power penalty across the bandwidth of the DCM in 10 pm steps was determined by increasing the optical power impinging upon the receiver until an immeasurable BER was achieved. For each wavelength, this power was increased to obtain a series of BER measurements ranging from ~$10^{-6}$ to ~$10^{-10}$ (about −21 dBm to about −18.5 dBm in the test the measurements of BER. The back-to-back performance of the test system was determined by removing the transmission fiber and the DCM from the system and repeating the process described above for the same range of wavelengths corresponding to the DCM bandwidth. FIG. 17 shows a power penalty <0.6 dB at a BER of $10^{-9}$, calculated by subtracting the back-to-back power from the DCM measurements.

Figure 18:
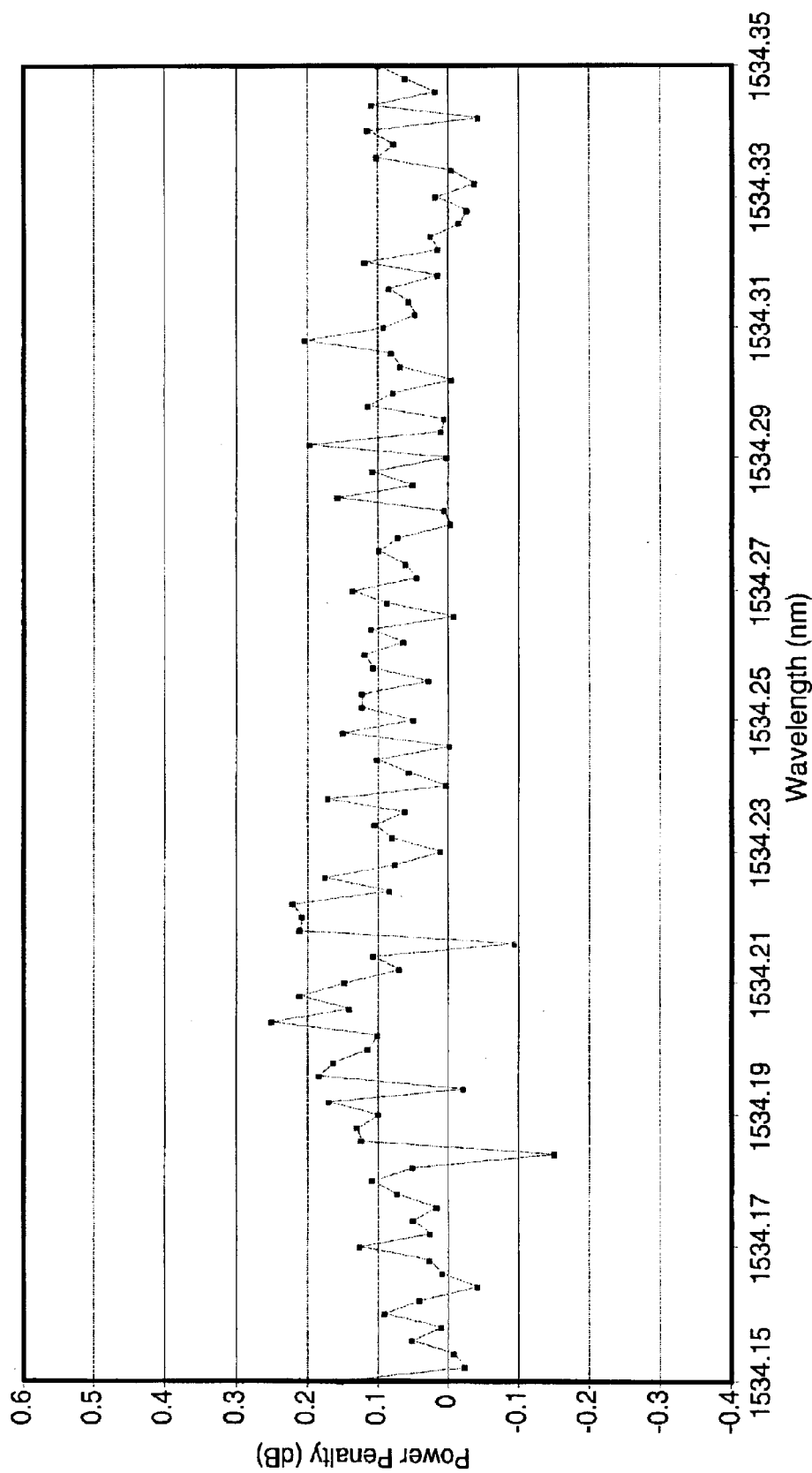
FIG. 18 shows the power penalty needed to obtain a BER of $10^{-10}$ across a 0.2 nm region centered at 1534.25 nm.
Figure 19:
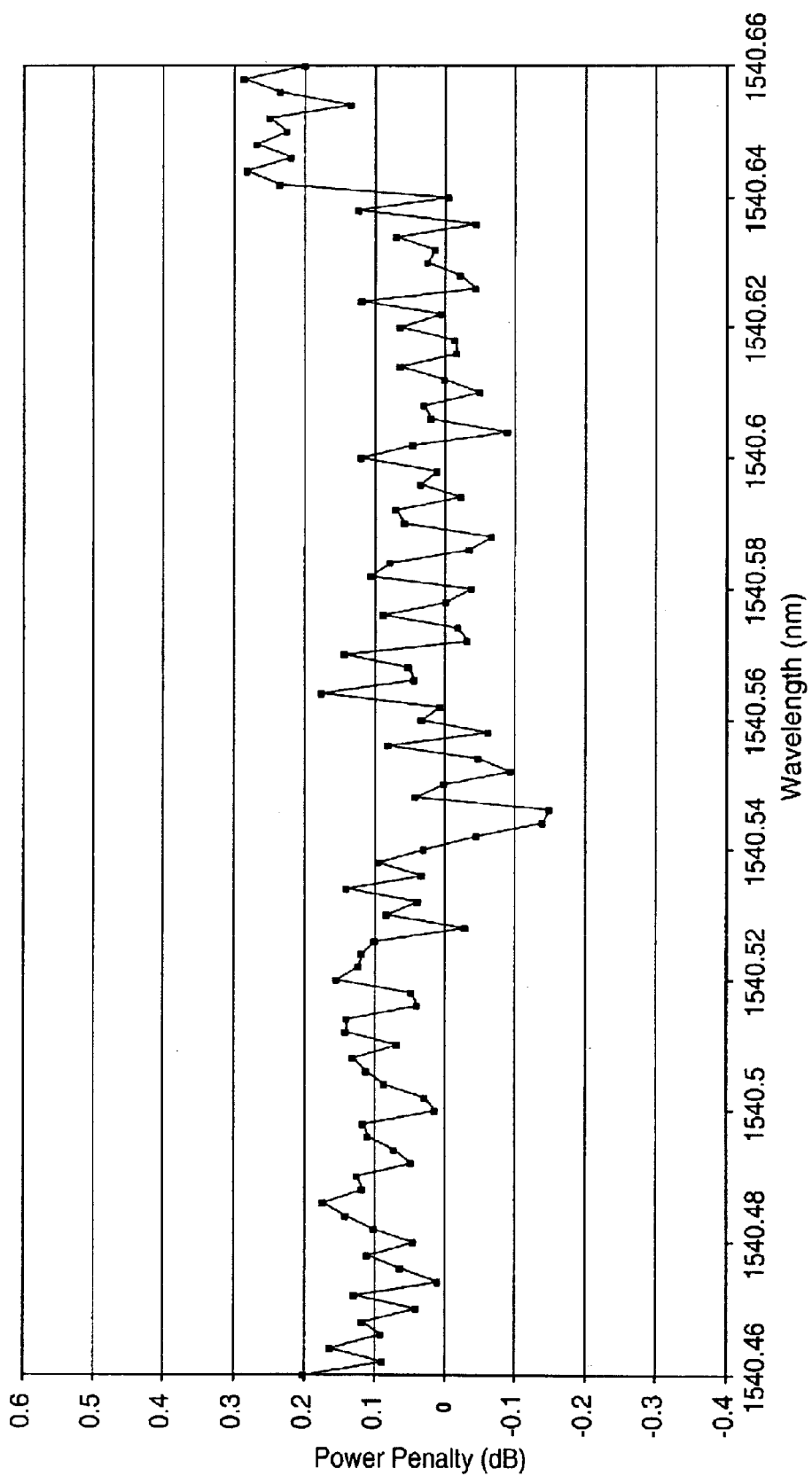
FIG. 19 shows the power penalty needed to obtain a BER of $10^{-10}$ across a 0.2 nm region centered at 1540.56 nm.
Figure 20:
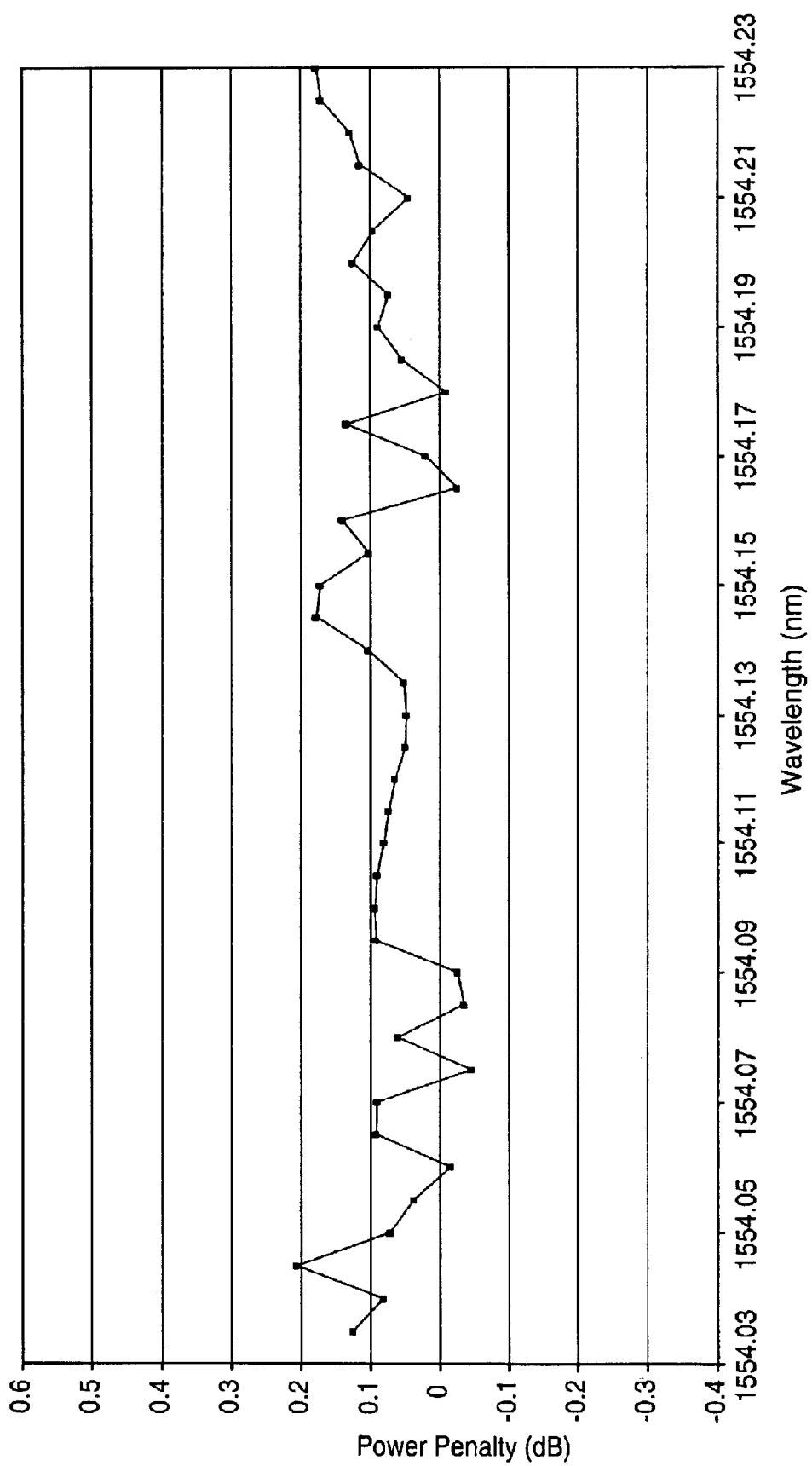
FIG. 20 shows the power penalty needed to obtain a BER of $10^{-10}$ across a 0.2 nm region centered at 1554.13 nm.

Interpolation error was a dominant factor in the previous determinations of power penalty. Evidence of this was obtained by more accurate measurement of select areas of the DCM. For each wavelength, the power was increased to obtain a series of BER measurements ranging from ~$10^{-6}$ to ~$10^{-11}$. Using the resulting curves and methods of interpolation, the power needed to obtain a BER of $10^{-10}$ was calculated for each wavelength. The back-to-back performance of the test system was determined, as before, by removing the transmission fiber and the DCM from the system. The power penalty at a BER of $10^{-10}$, calculated by subtracting the back-to-back power from the DCM measurements, was <0.3 dB across 0.2 nm centered about 1534.25 nm as shown in FIG. 18, <0.3 dB across 0.2 nm centered about 1540.56 nm as shown in FIG. 19, and <0.25 dB across 0.2 nm centered about 1554.13 nm as shown in FIG. 20.

Those skilled in the art will appreciate that the present invention may be used in the manufacture of a variety of optical components. While the present invention has been described with a reference to exemplary preferred embodiments, the invention may be embodied in other specific forms without departing from the spirit of the invention. Accordingly, it should be understood that the embodiments described and illustrated herein are only exemplary and should not be considered as limiting the scope of the present invention. Other variations and modifications may be made in accordance with the spirit and scope of the present invention.

What is claimed is:

1. A refractive index grating for dispersion compensation of a plurality of optical signals passing through an optical transmission line, said refractive index grating comprising:

a photosensitive optical fiber including a long length, chirped Bragg grating providing dispersion compensation over a wide bandwidth of said plurality of optical signals, said long length chirped Bragg grating having a reflection bandwidth and a weighted phase ripple amplitude wherein said reflection bandwidth has a full-width at half maximum that is greater than 25 nm, said weighted phase ripple amplitude being less than about 300 milliradians.

2. The refractive index grating of claim 1, wherein said weighted phase ripple amplitude is less than about 200 milliradians.

3. The refractive index grating of claim 2, wherein said weighted phase ripple amplitude is less than about 100 milliradians.

4. The refractive index grating of claim 1, wherein said long length, chirped Bragg grating has a dispersion, measured in reflection, that is greater than 100 ps/nm.

5. The refractive index grating of claim 4, wherein said long length, chirped Bragg grating has a dispersion, measured in reflection, that is greater than 400 ps/nm.

6. The refractive index grating of claim 4, wherein said long length, chirped Bragg grating is a matched Bragg grating that substantially compensates the dispersion characteristics of the optical fiber transmission line.

7. The refractive index grating of claim 6, wherein said matched Bragg grating has a parameter κ equal to the ratio of said dispersion and a dispersion slope characteristic of said matched Bragg grating over said wide bandwidth, said parameter κ substantially matching the optical fiber transmission line parameter κ.

8. The refractive index grating of claim 7, wherein said parameter κ differs less than ±10% from the transmission line parameter κ.

9. The refractive index grating of claim 7, wherein said parameter κ has a range from about 50 nm to about 300 nm.

10. The refractive index grating of claim 1, wherein said long length, chirped Bragg grating has a length exceeding about three meters.

* * * * *

UNITED STATES PATENT AND TRADEMARK OFFICE
CERTIFICATE OF CORRECTION

PATENT NO. : 6,901,188 B2
DATED : May 31, 2005
INVENTOR(S) : Brennan, James F. III Page 1 of 1

It is certified that error appears in the above-identified patent and that said Letters Patent is hereby corrected as shown below:

Column 7,
Line 54, delete "mn" and insert -- nm -- therefor.

Column 13,
Line 9, after "in the test" insert -- system). The power needed to obtain a BER of $10^{-9}$ for each wavelength was interpolated from --.

Signed and Sealed this

Sixth Day of September, 2005

JON W. DUDAS
*Director of the United States Patent and Trademark Office*